(12) United States Patent
Tatsuya et al.

(10) Patent No.: US 11,085,685 B2
(45) Date of Patent: Aug. 10, 2021

(54) REFRIGERATOR AND METHOD OF CONTROLLING SAME BASED ON AN ESTIMATION OF A VARYING STATE

(71) Applicant: Samsung Electronics Co., Ltd., Suwon-si (KR)

(72) Inventors: Shimizu Tatsuya, Yokohama (JP); Soda Yasushi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 16/552,887

(22) Filed: Aug. 27, 2019

(65) Prior Publication Data

US 2020/0064042 A1    Feb. 27, 2020

(30) Foreign Application Priority Data

Aug. 27, 2018  (JP) .............................. JP2018-158718
Nov. 14, 2018  (JP) .............................. JP2018-214086
Jun. 21, 2019  (KR) ........................ 10-2019-0074147

(51) Int. Cl.
*F25B 49/02* (2006.01)
*F25D 29/00* (2006.01)

(52) U.S. Cl.
CPC .......... *F25B 49/022* (2013.01); *F25B 49/025* (2013.01); *F25B 49/027* (2013.01);
(Continued)

(58) Field of Classification Search
CPC .......... F25B 49/00; F25B 49/02; F25D 29/00; F25D 2317/068; F25D 2500/04
See application file for complete search history.

(56) References Cited

U.S. PATENT DOCUMENTS 5,372,015 A * 12/1994 Suzuki ................. G05B 13/027
                                                  62/228.4
6,772,601 B1 * 8/2004 Davis .................... F25D 17/065
                                                  236/DIG. 12
(Continued)

FOREIGN PATENT DOCUMENTS

JP            2998847 B2     1/2000
JP         2016-90128 A      5/2016
(Continued)

OTHER PUBLICATIONS

International Search Report dated Dec. 30, 2019 in connection with International Patent Application No. PCT/KR2019/010942, 3 pages.

*Primary Examiner* — Jonathan Bradford

(57) ABSTRACT

A refrigerator includes a compressor configured to circulate a refrigerant, a condenser configured to condense the refrigerant circulated by the compressor, a cooling component configured to cool a storage compartment using the refrigerant condensed by the condenser, and a processor configured to control driving of the cooling component, acquire a load variation of the storage compartment of the refrigerator, the load variation having an effect on a refrigeration cycle, determine a drive value for driving a component forming the refrigeration cycle based on the load variation, drive the cooling component based on the drive value, and acquire the load variation with a lapse of time during at least one cooling period in which the refrigeration cycle cools the storage compartment.

16 Claims, 26 Drawing Sheets

(52) U.S. Cl.
CPC ........ _F25D 29/00_ (2013.01); _F25D 2317/068_ (2013.01); _F25D 2500/04_ (2013.01); _F25D 2700/12_ (2013.01); _F25D 2700/14_ (2013.01)

(56) References Cited

U.S. PATENT DOCUMENTS

| | | | |
|---|---|---|---|
| 8,869,546 B2 | 10/2014 | Besore et al. | |
| 2007/0240436 A1* | 10/2007 | Landers | F25B 49/022 62/157 |
| 2011/0112814 A1* | 5/2011 | Clark | F25B 49/005 703/9 |
| 2012/0023980 A1 | 2/2012 | Lee et al. | |
| 2015/0047381 A1* | 2/2015 | Fujimoto | F25B 49/02 62/180 |

FOREIGN PATENT DOCUMENTS

| | | |
|---|---|---|
| KR | 10-2011-0051369 A | 5/2011 |
| KR | 10-2014-0124222 A | 10/2014 |
| KR | 10-2018-0006672 A | 1/2018 |

\* cited by examiner

FIG.3

| | REVOLUTION PER MINUTE (RPM) OF COMPRESSOR | POWER CONSUMPTION |
|---|---|---|
| × | 1100 RPM | 35 W |
| ... | ... | ... |
| ○ | 2100 RPM | 80 W |
| ○ | 2150 RPM | 85 W |
| ○ | 2200 RPM | 90 W |
| ... | ... | ... |
| ○ | 3700 RPM | 150 W |

REFRIGERATOR AND METHOD OF CONTROLLING SAME BASED ON AN ESTIMATION OF A VARYING STATE

CROSS-REFERENCE TO RELATED APPLICATIONS

This application is based on and claims priority under 35 U.S.C. 119 to Korean Patent Application No. 10-2019-0074147, filed on Jun. 21, 2019, in the Korean Intellectual Property Office, which claims the benefit of Japanese Patent Application No. 2018-158718, filed on Aug. 27, 2018, and No. 2018-214086, filed on Nov. 14, 2018 in the Japan Patent Office, the disclosures of which are herein incorporated by reference in their entireties.

BACKGROUND

1. Field

The disclosure relates to a refrigerator capable of performing control suitable to a state thereof and a control method thereof.

2. Description of Related Art

As for refrigerator-freezer including a body having a storage compartment therein, a vacuum insulator arranged in a heat insulating wall of the body, a compressor forming a part of the refrigeration cycle and capable of varying a rotational speed, and a control device controlling the compressor, a technique relate to the control device maintaining an upper limit value of the rotational speed of the compressor at a first speed for a time length TL after a power is supplied to the refrigerator-freezer, and the control device increasing the upper limit value of the rotational speed of the compressor to a second speed greater than the first speed after the time length TL, is already known in the art.

SUMMARY

In the case where a configuration, which is capable of determining a set value range of a component constituting the refrigeration cycle according to a period of time after power is supplied, is employed, it is impossible to drive the component constituting the refrigeration cycle in accordance with a state at a time before a state in which the refrigeration cycle cools a certain storage compartment is switched to a state the refrigeration cycle does not cool the certain storage compartment.

Therefore, it is an aspect of the present disclosure to provide a refrigerator capable of driving a component constituting the refrigeration cycle in accordance with a state at a time before a state in which the refrigeration cycle cools a certain storage compartment is switched to a state the refrigeration cycle does not cool the certain storage compartment.

Additional aspects of the disclosure will be set forth in part in the description which follows and, in part, will be obvious from the description, or may be learned by practice of the present disclosure.

In accordance with an aspect of the disclosure, a refrigerator includes a compressor configured to circulate a refrigerant, a condenser configured to condense the refrigerant circulated by the compressor, a cooling component configured to cool a storage compartment by the refrigerant condensed by the condenser and at least one processor configured to control driving of the cooling component and the at least one processor obtains a load variation of the storage compartment of the refrigerator including a refrigeration cycle, identifies a drive value for driving a component forming the refrigeration cycle based on the load variation, drives the cooling component based on the drive value, and obtains the load variation with the lapse of time during at least one cooling period in which the refrigeration cycle cools the storage compartment.

During a predetermined period shorter than the cooling period, the at least one processor may obtain the load variation by using a specific value of a first state varying with time and including an internal temperature of the storage compartment.

Based on the specific value of the first state, the at least one processor may identify a specific value of a second state corresponding to a state of the component, as the drive value.

The at least one processor may identify the drive value based the specific value of the second state and drive the component by using the drive value.

The first state may include at least one of an internal temperature and an external temperature of the refrigerator and the second state may include setting of the component.

The setting may include setting of a degree of cooling of the cooling component.

The setting of a degree of cooling may include the number of revolutions of the compressor.

The cooling component may further include an expansion valve, and the setting of a degree of cooling may include an opening degree of the expansion valve.

The cooling component may further include a fan and the setting of a degree of cooling may include the number of revolutions of the fan.

The at least one processor may identify the specific value of the second state satisfying a constraint condition.

The at least one processor may identify a change in the first state value corresponding to a plurality of the second state values, based on the specific value of the first state, and the at least one processor may identify at least two values of the second state satisfying the constraint condition based on the change in the first state value and the plurality of the second state values, and identify the specific value of the second state based on the at least two values of the second state.

The at least one processor may identify the change in the first state value corresponding to a plurality of the second state values, as an estimation model, the at least one processor may identify a state of the estimation model based on the specific value of the first state and the change in the first state value based on a past value of the first state, and the at least one processor may estimate a change in the first state value based on the specific value of the first state based on the state of the estimation model.

The at least one processor may estimate each indicator for at least two values of the second state based on the specific value of the first state, and identify the specific value of the second state from the at least two values of the second state based on the indicator.

The indicator may include power consumption of the refrigerator, and the specific value of the second state may be a set value of the component making the power consumption minimized.

When the refrigeration cycle is configured to alternately cool a first storage compartment and a second compartment, the at least one processor may use allowing one of a temperature of the first storage compartment and a temperature of the second compartment to be decreased to reach a predetermined temperature until the other of the temperature of the first storage compartment and the temperature of the second compartment is increased to reach a predetermined temperature, as the constraint condition.

When the refrigeration cycle is configured to simultaneously cool a first storage compartment and a second compartment, the at least one processor may use allowing one of a temperature of the first storage compartment and a temperature of the second compartment to be increased to reach a predetermined temperature until the other of the temperature of the first storage compartment and the temperature of the second compartment is increased to reach a predetermined temperature, as the constraint condition.

During a period in which the constraint condition is satisfied at an end point thereof, the at least one processor may estimate whether or not the constraint condition is satisfied at an end point thereof based on the specific value of the first state, a plurality of times, and the at least one processor may identify the specific value of the second state.

During a period in which the constraint condition is satisfied at an end point thereof, the at least one processor may estimate a change in the first state value for each the plurality of the second state values based on the specific value of the first state, estimate whether or not the constraint condition is satisfied at an end point thereof a plurality of times, identify at least two values of the second state to allow the constraint condition to be satisfied at the end point based on the change in the first state value and the plurality of the second state values, and identify the specific value of the second state based on the at least two values of the second state.

The at least one processor may form an estimation model configured to generate a stop condition or the drive value of the component based on the past load variation and based on training of time series data in which the past drive values, which is identified based on the past load variation, are accumulated in a time series, and the at least one processor may change the stop condition or the drive value according to the load variation based on the estimation model.

In accordance with an aspect of the disclosure, a control method of a refrigerator includes acquiring a load variation of a storage compartment of the refrigerator, determining a drive value, which is to drive a component implementing a refrigeration cycle based on the load variation, driving the component based on the drive value, and acquiring the load variation with the lapse of time during at least one period in which the refrigeration cycle cools the storage compartment.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terra "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVI)), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of embodiments, taken in conjunction with the accompanying drawings of which:

FIG. 3 is a table illustrating power consumption for each RPM of the compressor input to the controller from a power estimator of the control device according to an embodiment of the disclosure;

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter embodiments of the disclosure will be described in detail with reference to the accompanying drawings.

According to an embodiment of the disclosure, a control device is configured to obtain a specific value of a first state varying with time and identify a specific value of a second state corresponding to a state of a component based on the specific value of the first state at a predetermined period, and drive the component by using the specific value of the second state. Hereinafter a refrigeration cycle control device capable of controlling a refrigeration cycle will be described as an example of the control device, a temperature of an inside or an outside of a refrigerator, in which a refrigeration cycle is embedded, will be described as an example of the first state, and setting a component forming the refrigeration cycle will be described as an example of the second state. The predetermined period will be described as a period of time that is shorter than a period of time in which a state in which the refrigeration cycle cools a certain storage compartment is changed to a state in which the refrigeration cycle does not cool the certain storage compartment. The period in which a state in which the refrigeration cycle cools a certain storage compartment is changed to a state in which the refrigeration cycle does not cool the certain storage compartment may include a period of time in which a state, in which a refrigerant flows to a refrigerating compartment or a freezing compartment because a compressor is turned on, is changed to a state, in which the refrigerant does not flow to the refrigerating compartment or the freezing compartment because the compressor is turned off. Alternatively, when the compressor is turned on, the period may include a period of time in which a state, in which the refrigerant flows to the refrigerating compartment is changed to a state, in which the refrigerant does not flow to the refrigerating compartment and a period in which a state, in which the refrigerant flows to the freezing compartment is changed to a state, in which the refrigerant does not flow to the freezing compartment. A period of time in which a storage compartment cooled by the refrigeration cycle is switched between the refrigerating compartment and the freezing compartment may be a typical example of such a period.

Figure 1:
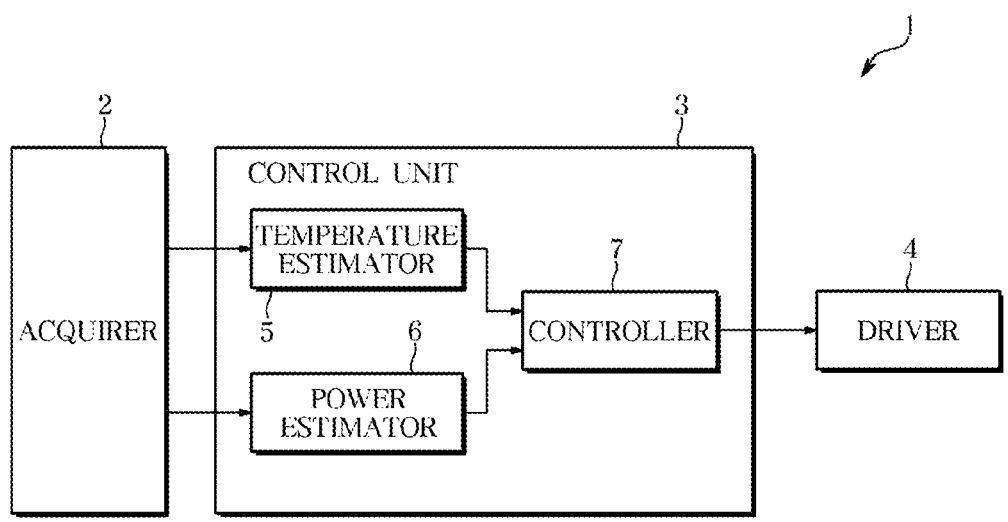
FIG. 1 is a block diagram illustrating an example of a functional configuration of a control device according to an embodiment of the disclosure.

FIG. 1 is a block diagram illustrating an example of a functional configuration of a control device 1 according to an embodiment of the disclosure. As illustrated in FIG. 1, the control device 1 includes an acquirer 2, a control unit 3 and a driver 4.

The control device 1 may be implemented by including at least one of a memory (not shown) for storing algorithm for controlling the operation of the components or storing data for a program reproducing an algorithm, and a processor (not shown) for performing the above mentioned operation by using the data stored in the memory. At this time, the memory and the processor may be implemented as separate chips. Alternatively, the memory and the processor may be implemented on a single chip.

Further, as mentioned later, the acquirer 2, the control unit 3 and the driver 4 may be provided by at least one processor.

The acquirer 2 obtains information such as a present value of an internal temperature and an external temperature of the refrigerator and entire revolutions per minutes (RPM) of the compressor, and the acquirer 2 inputs the information to the control unit 3 at a predetermined period. When the information obtained by the acquirer 2 is the present value of the internal temperature, the acquirer 2 may correspond to a temperature sensor installed inside the refrigerator. Alternatively, when the information obtained by the acquirer 2 is the present value of the external temperature, the acquirer 2 may correspond to a temperature sensor installed outside the refrigerator. The entire RPM of the compressor may represent all kinds of number of revolutions performed by the compressor. For example, it is assumed that the RPM that is cannot be obtained due to the resonance is excluded. However, the entire RPM of the compressor may not be obtained by the acquirer 2, but may be stored in advance by the control unit 3. According to an embodiment, the internal temperature and the external temperature of the refrigerator may be used as an example of the first state, and the present value of the internal temperature and the external temperature of the refrigerator may be used as an example of the specific value of the first state. Further, the acquirer 2 may be installed as an example of an acquirer configured to obtain a load variation of the storage compartment of the refrigerator and an acquirer configured to obtain the specific value of the first state.

At the predetermined period, the control unit 3 autonomously identifies the RPM of the compressor, which satisfies a temperature constraint condition (hereinafter referred to as 'constraint condition') and makes power consumption minimized, based on the present value of the internal temperature and the external temperature of the refrigerator and the entire RPM of the compressor, which are input through the acquirer 2, and the control unit 3 outputs a command value of the RPM to the driver 4. When the present value of the internal temperature and the external temperature of the refrigerator changes that is a thermal load is applied, a waveform of the future temperature change for each RPM of the compressor may be changed. The identified command value of the RPM of the compressor may be different from or the same as the present value. That is, the command value may be reformed according to the period, or although the command value is the same as the present value, the command value may command a value of the RPM that is different from the present value. According to an embodiment, a compressor is used as an example of a component configuring the refrigeration cycle and an example of a cooling component for cooling at least one storage compartment in the refrigerator. The RPM of the compressor is used as an example of the second state corresponding to a setting of the component and an example of setting of a degree of cooling related to a cooling level using the cooling component. The command value of the RPM of the compressor is used as an example of a drive value driving a component and the specific value of the second state. Alternatively, a set value of a component that maximizes the internal humidity may be used as the specific value of the second state. As an example of a determiner configured to identify a drive value and a determiner configured to identify the specific value of the second state, the control unit 3 is installed.

The driver 4 drives the compressor based on the command value output from the control unit 3 at the predetermined period. According to an embodiment, the driver 4 is installed as an example of a driver for driving a component.

Hereinafter the control unit 3 will be described in details. The control unit 3 includes a temperature estimator 5, a power estimator 6, and a controller 7.

The temperature estimator 5 periodically estimates a temperature change for each RPM of the compressor by using an estimation model based on the present value of the internal temperature and the external temperature of the refrigerator and the entire RPM of the compressor which are input through the acquirer 2, and the temperature estimator 5 inputs the temperature change to the controller 7. The estimation model may be followed by deterioration of the heat insulating performance by being trained again periodically (for example, every half year). A transfer function model and a neural network model may be used as the estimation model.

The power estimator 6 periodically estimates power consumption for each RPM of the compressor by using an estimation model based on the present value of the external temperature of the refrigerator and the entire RPM of the compressor which are input through the acquirer 2, and the temperature estimator 5 inputs the power consumption to the controller 7. The estimation model may be followed by deterioration of the heat insulating performance by being trained again periodically (for example, every half year). A transfer function model and a neural network model may be used as the estimation model. The reason why the power estimator 6 does not use the present value of the internal temperature is because the present value of the internal temperature is within a limited narrow range to some extent and it is not appropriate to use the present value of the internal temperature. However, alternatively, the present value of the internal temperature may be used.

The controller 7 specifies a plurality of RPM satisfying the constraint condition based on the temperature change for each RPM of the compressor input from the temperature estimator 5. In addition, based on the power consumption for each RPM of the compressor input from the power estimator 6, the controller 7 autonomously selects the RPM of the compressor making the power consumption minimized among the specified plurality of RPM. The controller 7 outputs a command value commanding the identified RPM of the compressor. In this case, the RPM of the compressor may be different from the previous RPM or the same as the previous RPM.

Further, the control unit 3 may identify the command value of the RPM of the compressor by using artificial intelligence (AI). In this case, without periodically being trained by using the estimation model based on the present value of the internal temperature and the external temperature of the refrigerator and the entire RPM of the compressor, the control unit 3 may vary the command value of the RPM of the compressor according to the load variation, based on an estimation model in which a command value of RPM of the compressor is identified by the AI. Further, the control unit 3 may further include a data exchanger configured to exchange data with a plurality of motor (compressor or fan), and thus the control unit 3 may use a drive value of another motor for training the estimation model thereof.

Particularly, upon forming the estimation model, the AI autonomously identifies the command value of the RPM of the compressor based on a past value of the internal temperature and the external temperature of the refrigerator and time series data in which a past command value of RPM of the compressor, which is identified based on the past value of the internal temperature and the external temperature, are accumulated in the time series manner. For example, the AI identifies a value of a correlated operation based on the load variation of the inside of the refrigerator and the lapse of time of the RPM of the compressor. When the control unit 3 additionally observes the drive values of components other than the RPM of the compressor, the AI may autonomously identify the value of the operation by considering RPM of a fan motor, a stop condition of the compressor with the lapse of time as well as the RPM of the compressor. Alternatively, when the controller 3 observes not only the RPM of the compressor but also the power consumption of the compressor or the fan motor, the AI may identify the value of the operation by considering the power consumption as well as the RPM of the compressor of the fan motor. Further, when the controller 3 observes the change in the RPM of the fan motor upon turning on or off of the fan motor, the AI may identify the value of the operation by considering the change in the RPM of the fan motor as well as the RPM of the fan motor.

A change value such as an internal and external humidity of the refrigerator, a temperature of an evaporator (e.g., a temperature of an inlet of the evaporator and a temperature of an outlet of the evaporator), a pressure of the compressor or the refrigerant (high pressure or low pressure), and a flow of rate of the refrigerant, may be used as other parameters.

Figure 2:
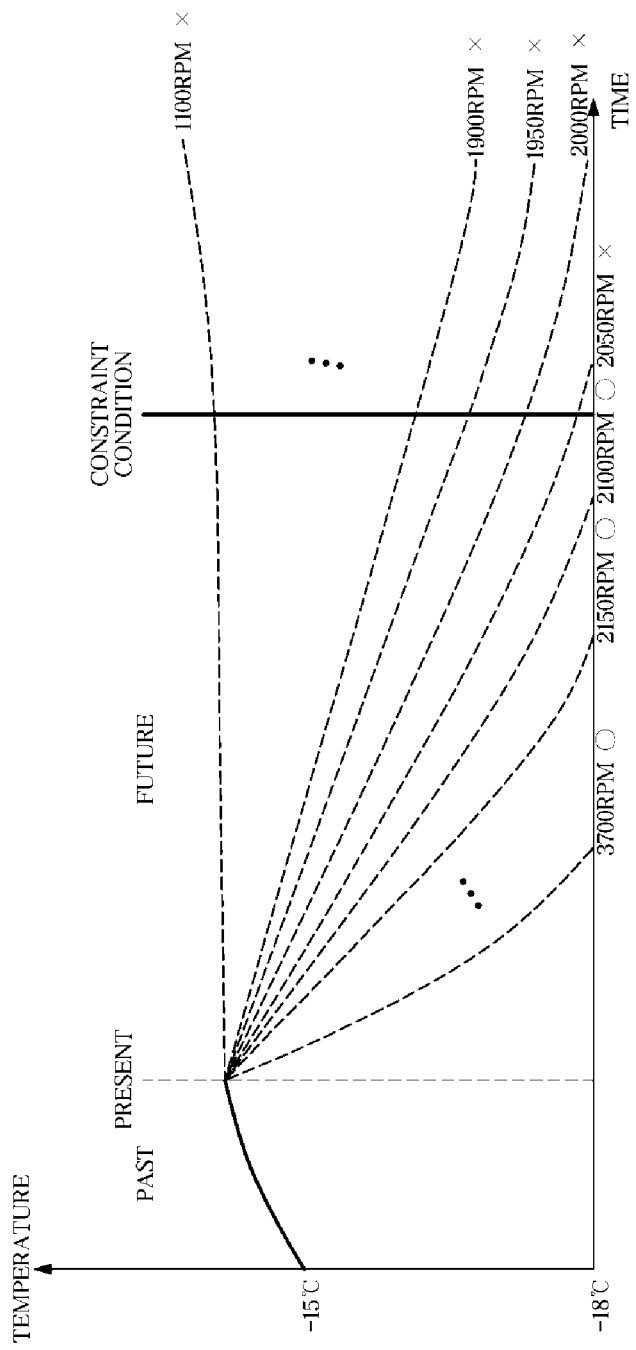
FIG. 2 is a graph illustrating a change in the temperature for each revolutions per minute (RPM) of a compressor input to a controller from a temperature estimator of the control device according to an embodiment of the disclosure.

FIG. 2 is a graph illustrating a temperature change of each RPM of the compressor input to the controller 7 from the temperature estimator 5. In this graph, a thick vertical line indicates a constraint condition. That is, cooling performed at a temperature −18° C. or lower to time t is defined as a constraint condition. In the graph illustrating the RPM of the compressor, 1100 RPM to 2050 RPM to which "X" is assigned does not satisfy the constraint condition and 2100 RPM to 3700 RPM to which "0" is assigned satisfies the constraint condition. Therefore, the controller 7 specifies from 2100 RPM to 3700 RPM for the RPM of the compressor satisfying the constraint condition. That is, the RPM of the compressor that is selectable may be narrow down by the constraint condition. According to an embodiment, the graph illustrating the temperature change for each RPM of the compressor is used as an example of the change of the first state value for each of a plurality of values of the second state.

FIG. 3 is a table illustrating power consumption for each RPM of the compressor input to the controller 7 from the power estimator 6. The controller 7 selects and outputs the RPM of the compressor having the smallest power consumption among a plurality of specified RPM, based on the power consumption for each RPM of the compressor. Particularly, the controller 7 selects 2100 RPM in which the power consumption is the smallest from 2100 RPM to 3700 RPM to which '0' is assigned, as surrounded by a thick frame. At this time, it is considered that the regularity, in which the power consumption is increased as the RPM of the compressor is increased, is not guaranteed due to the characteristics of the motor efficiency, and thus the RPM of the compressor having the smallest power consumption is identified as mentioned above. However, when the regularity, in which the power consumption is increased as the RPM of the compressor is increased, is guaranteed, that is when the order is not changed such that the power consumption is reduced although the RPM of the compressor is increased, it does not correspond to the above mentioned case. In this case, the RPM of the compressor having the smallest power consumption among the specified plurality of RPM based on the power consumption for each RPM of the compressor is not selected, but the smallest RPM among the specified plurality of RPM is selected. In this case, the RPM of the compressor having the smallest power consumption is selected because of the purpose of energy saving, but alternatively, the RPM of the compressor may be selected by using an indicator other than the power consumption. For example, the internal humidity of the refrigerator may be used as the indicator. According to an embodiment, the power consumption for each RPM of the compressor is used as an example of the indicator for each of at least two values in the second state.

Figure 4:
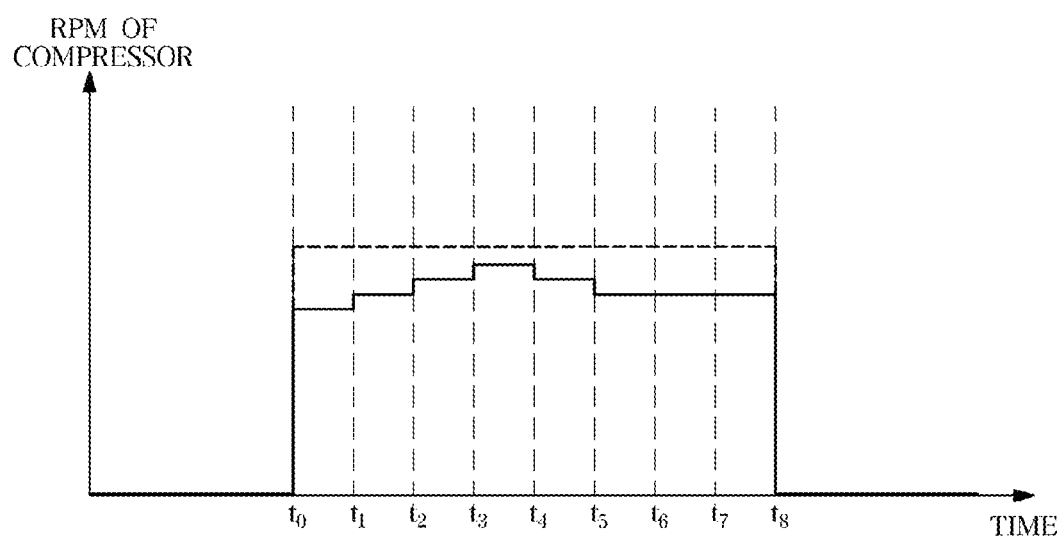
FIG. 4 is a graph illustrating a change in the RPM of the compressor output by the controller of the control device according to an embodiment of the disclosure.

FIG. 4 is a graph illustrating a change in the RPM of the compressor output by the controller 7. In this graph, a broken line shows a change in the RPM of a compressor in a conventional refrigerator, and a solid line shows a change in the RPM of the compressor in the refrigerator to which an embodiment is applied. In the conventional refrigerator, when a change in the thermal load occurs due to a door being opened at a time $t_0$, the compressor operates for a predetermined period of time (until a time $t_8$ in the graph) at a RPM for sufficiently cooling. On the other hand, in the refrigerator to which an embodiment is applied, the controller 7 outputs the RPM having the smallest power consumption every estimated period, as a command value. Therefore, when a change in the thermal load occurs due to a door being opened at time $t_0$, the compressor operates until time $t_1$ with the minimum necessary RPM. When a load of the food is larger than an expected load, the compressor operates while slightly increasing the RPM until time $t_3$. When the food is cooled and then the load is lowered, the compressor operates while slightly reducing the RPM until time $t_8$.

Further, it is assumed that the constraint condition is satisfied at the time $t_8$, and thus the RPM of the compressor is not changed at time $t_6$ and time $t_7$. However, when a change in the thermal load occurs due to a door being opened from time is to time $t_6$, the RPM of the compressor may be changed at time $t_6$ and time $t_7$. Accordingly, it may be expected again that the constraint condition is satisfied at time $t_8$ or it may be expected again that the constraint condition is satisfied after time $t_8$ not at time $t_8$. In this case, time $t_8$ is an example of an end of a period, and a period from time $t_0$ to time $t_8$ is an example of a period in which it is expected that the constraint condition is satisfied at the end point of the period. Estimating the RPM of the compressor at time $t_6$ and time $t_7$ is an example of estimating whether the constraint condition is satisfied at the end point of the period, a plurality of times.

When a food having a temperature significantly lower than the internal temperature of the refrigerator is put and thus the thermal load is significantly lowered, a difference occurs between the change in the RPM of the compressor in the conventional refrigerator and the change in the RPM of the compressor in the refrigerator to which an embodiment is applied.

Figure 5A:
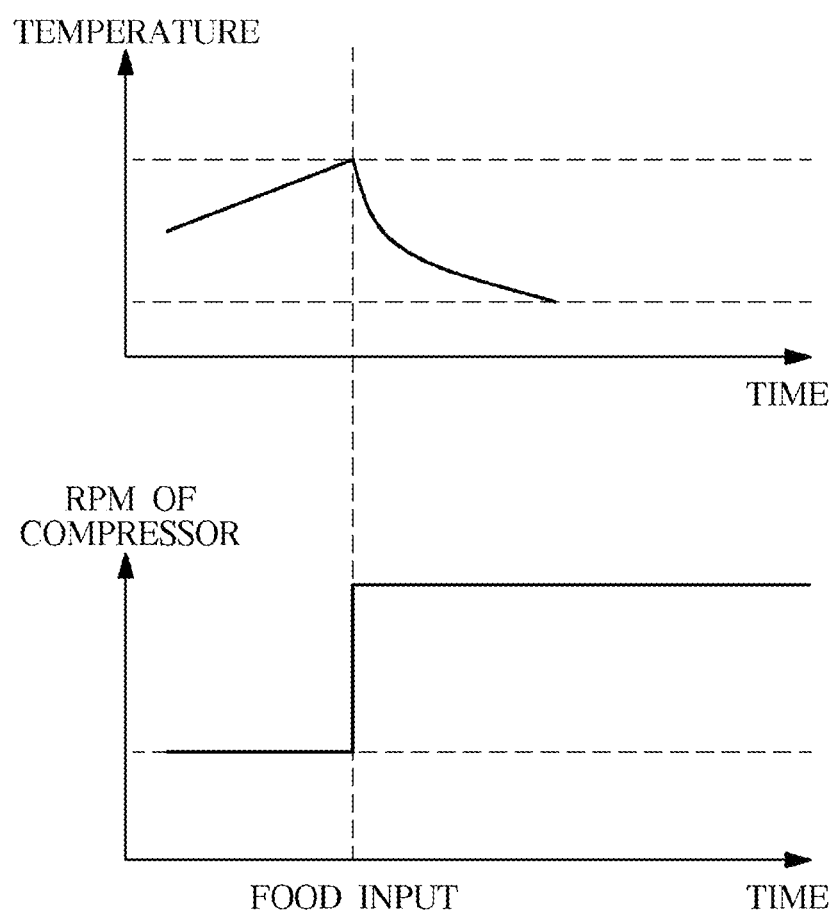
FIG. 5A is a graph illustrating a change in the temperature and the RPM of a compressor in a conventional refrigerator.

FIG. 5A is a graph illustrating a change in the temperature and RPM of a compressor in the conventional refrigerator. A graph showing the change in the RPM of the compressor indicates that the refrigerator detects the opening and closing of the door and then raises the RPM of the compressor for a predetermined period. A graph showing the change in the temperature indicates that the temperature is instantly increased due to the opening and closing of the door, and then the temperature is suddenly decreased because a state in which the RPM of the compressor is increased is maintained for the predetermined period.

Figure 5B:
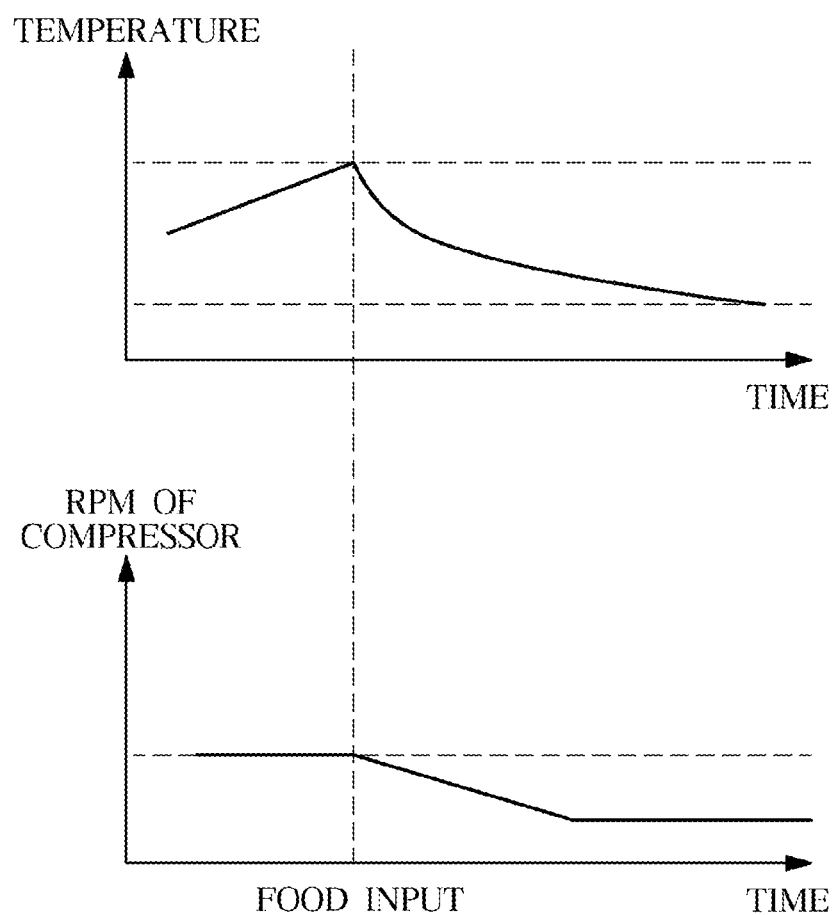
FIG. 5B is a graph illustrating a change in the temperature and the RPM of a compressor in a refrigerator to which an embodiment of the disclosure is applied.

FIG. 5B is a graph illustrating a change in the temperature and RPM of the compressor in the refrigerator to which an embodiment is applied. In the refrigerator to which an embodiment is applied, when the difference between the estimated temperature change and the actual temperature change occurs due to the change in the thermal load, the RPM of the compressor may be changed based on the difference because the change in the internal temperature is periodically estimated. That is, periodically estimating and determining the RPM of the compressor having the smallest power consumption is equivalent to performing feedback based on the difference even when the estimation is deviated. That is, the graph showing the change in the RPM of the compressor indicates that the refrigerator may instantly increase the RPM of the compressor by detecting opening and closing of the door, but the refrigerator may decrease the RPM of the compressor by quantitatively detecting the thermal load indirectly by a displacement of the temperature change in the estimation of the temperature change in a state in which the food is not put. Further, the graph showing the change of the temperature indicates that the temperature is instantly increased due to the opening and closing of the door, and then the RPM of the compressor is decreased, and thus the temperature is gradually decreased in comparison with the conventional refrigerator.

Figure 6:
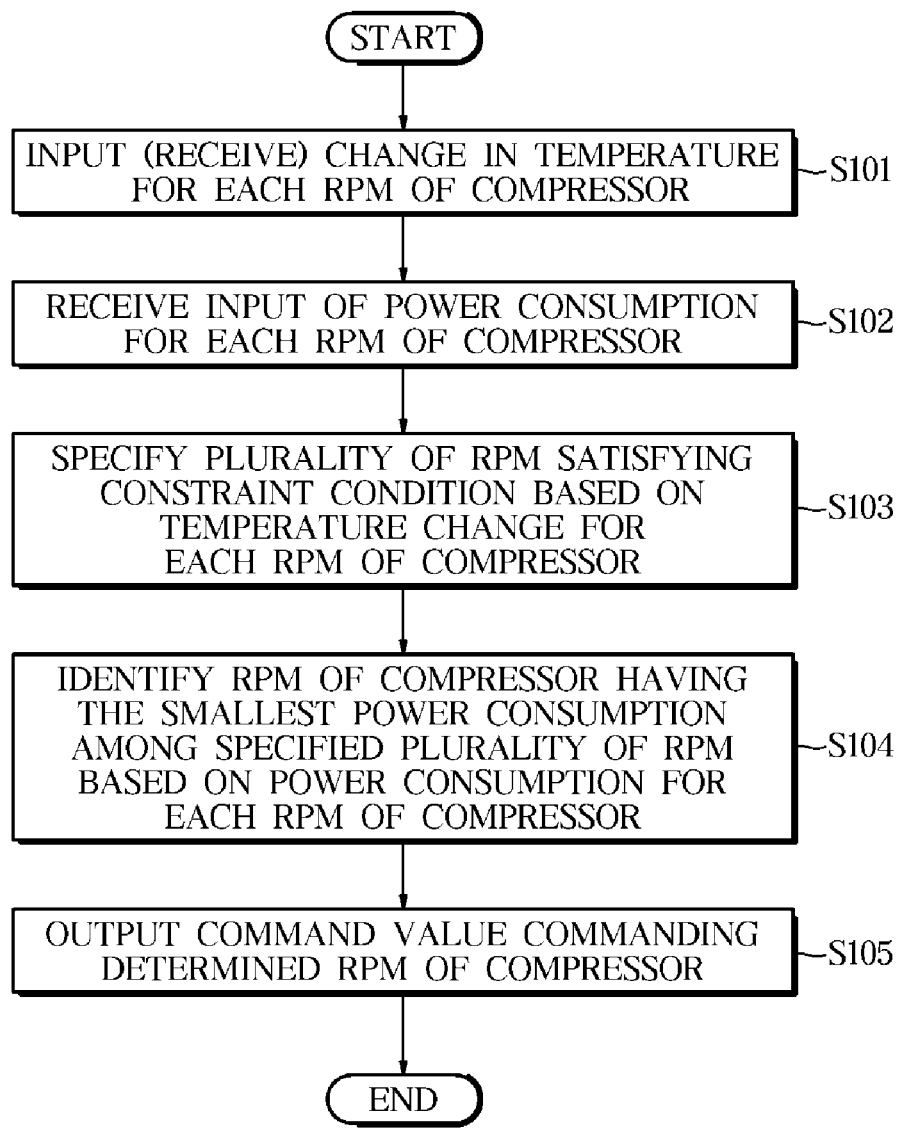
FIG. 6 is a flow chart illustrating an operation example of the controller of the control device according to an embodiment of the disclosure.

FIG. 6 is a flow chart illustrating an operation example of the controller 7. This operation example is repeatedly executed at the predetermined period.

As illustrated in the drawings, the controller 7 receives an input of the temperature change for each RPM of the compressor from the temperature estimator 5 (S101). Further, the controller 7 receives an input of the power consumption for each RPM of the compressor from the power estimator 6 (S102). It is described that step 102 is executed after executing step 101, but is not limited thereto. Alternatively, step 101 may be executed after executing step 102 or step 101 and step 102 may be executed simultaneously.

Next, the controller 7 specifies a plurality of RPM satisfying the constraint condition based on the temperature change for each RPM of the compressor corresponding to the input received in step 101 (S103).

Next, the controller 7 identifies the RPM of the compressor having the smallest power consumption among the plurality of RPM specified in step 103, based on the power consumption for each RPM of the compressor corresponding to the input received in step 102 (S104).

Finally, the controller 7 outputs a command value indicating the RPM of the compressor identified in step 104 (S105).

In the above description, the control unit 3 estimates the temperature change and the power consumption for each RPM of the compressor, outputs a command value of RPM of the compressor that satisfies the constraint condition and minimizes power consumption, and allows the driver 4 to drive the compressor based on the command value, but is not limited thereto. For example, the control unit 3 may estimate the temperature change and the power consumption for each opening degree of the expansion valve, outputs a command value of opening degree of the expansion valve that satisfies the constraint condition and minimizes power consumption, and allows the driver 4 to drive the expansion valve based on the command value. Alternatively, the control unit 3 may estimate the temperature change and the power consumption for each RPM of the fan, outputs a command value of RPM of the fan that satisfies the constraint condition and minimizes power consumption, and allows the driver 4 to drive the fan based on the command value.

Figure 7:
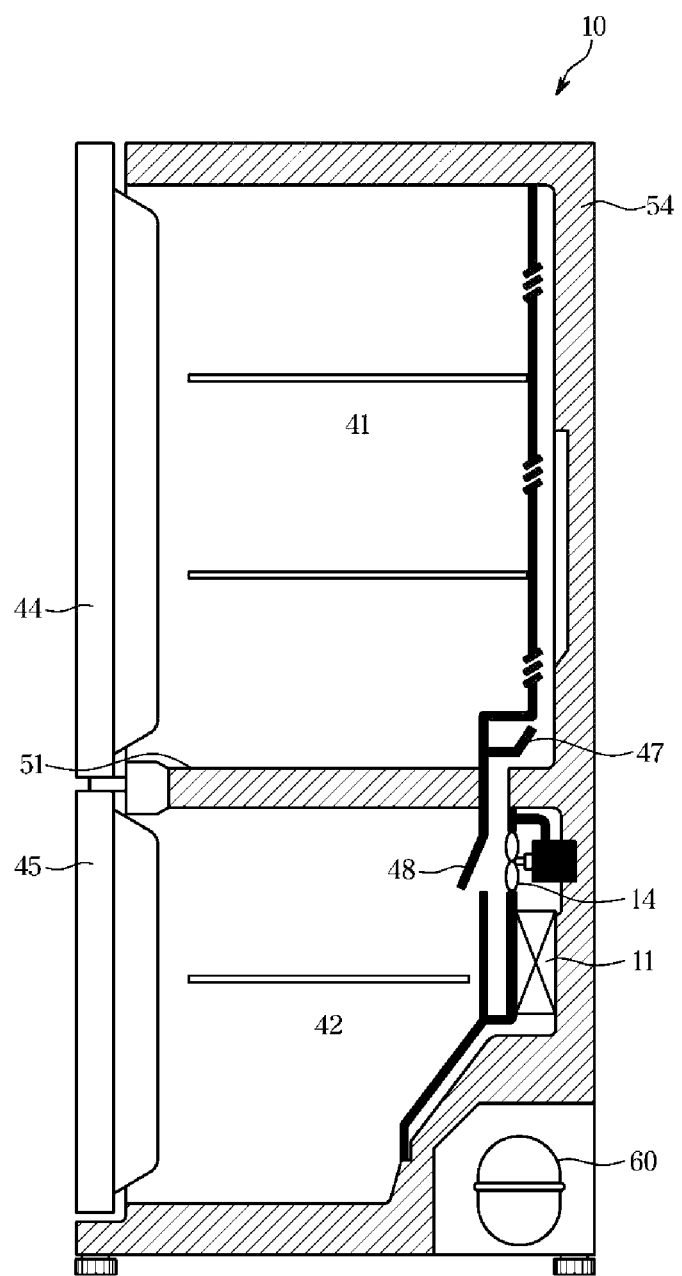
FIG. 7 is a view illustrating an example of an overall configuration of a refrigerator according to a first application example of an embodiment of the disclosure.

FIG. 7 is a view illustrating an example of an overall configuration of the refrigerator 10 according to an embodiment of the disclosure. As illustrated in the FIG. 7, the refrigerator 10 includes a refrigerating compartment 41 as an example of a storage compartment and a first storage compartment formed in the upper portion of the inside of the refrigerator, and a freezing compartment 42 as an example of a storage compartment and a second storage compartment formed in the lower portion of the inside of the refrigerator. The refrigerator 10 includes a compressor 60 compressing and circulating a refrigerant, an evaporator 11 evaporating the refrigerant circulated by the compressor 60, a fan 14 blowing cool air to the evaporator 11, a damper 47 transmitting air blown by the fan 14 to the refrigerating compartment 41, and a damper 48 transmitting air blown by the fan 14 to the freezing compartment 42. The refrigerator 10 includes a refrigerating compartment door 44 opened and closed for storing foods into the refrigerating compartment 41, a freezing compartment door 45 opened and closed to store foods into the freezing compartment 42, an intermediate partition wall 51 separating the refrigerating compartment 41 from the freezing compartment 42 and a rear wall 54 installed in the rear side cross over the refrigerating compartment 41 to the freezing compartment 42.

Figure 8:
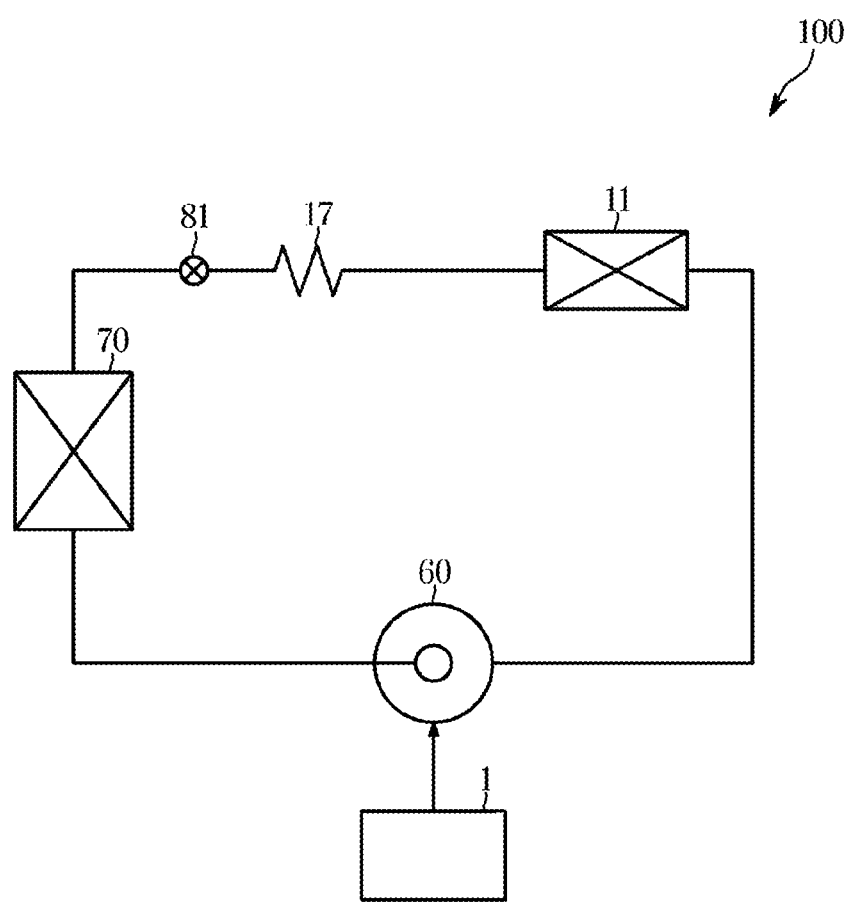
FIG. 8 is a view illustrating an example of a refrigeration cycle in the first application example of an embodiment of the disclosure.

FIG. 8 is a view illustrating a configuration of a refrigeration cycle 100 corresponding to an example of a refrigeration cycle device embedded in the refrigerator 10. As illustrated in FIG. 8, the refrigeration cycle 100 includes a compressor 60 circulating a refrigerant and a condenser 70 condensing the refrigerant circulated by the compressor 60. The evaporator 11 evaporating the refrigerant condensed by the condenser 70 to cool at least one of the refrigerating compartment 41 and the freezing compartment 42 is connected to the condenser 70.

In addition, an expansion valve 81 and a capillary tube 17 that are to expand the refrigerant flowing into the evaporator 11 is connected to the inlet side of the evaporator 11.

In addition, the refrigeration cycle 100 includes the control device 1 described with reference to FIGS. 1 to 6. In this case, based on the present value of the internal temperature and the external temperature of the refrigerator, the control device 1 identifies a command value of at least one compartment among the RPM of the compressor 60, the opening degree of the expansion valve 81, and the RPM of the fan 14, which satisfy the constraint condition and minimize the power consumption, at the predetermined period. The control device 1 drives the corresponding component by using the command value.

Figure 9:
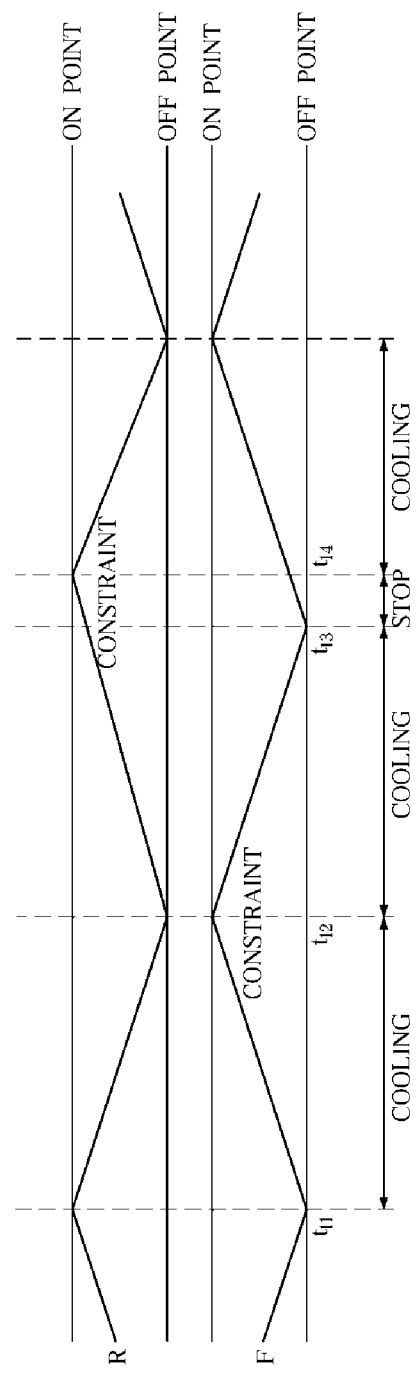
FIG. 9 is a graph illustrating a temperature change in a state in which a refrigerating compartment and a freezing compartment are alternately cooled by using the refrigeration cycle in the first application example of an embodiment of the disclosure.

FIG. 9 is a graph illustrating a temperature change in a state in which the refrigerating compartment 41 and the freezing compartment 42 are alternately cooled by using the refrigeration cycle 100. In the graph, a vertical axis represents a temperature, "R" represents a change in the temperature of the refrigerating compartment 41, and "F" represents a change in the temperature of the freezing compartment 42. In this case, the control device 1 controls the cooling capacity in such a way that timing for a compartment in which cooling is performed is adjusted for a compartment in which a temperature thereof is increased between the refrigerating compartment 41 and the freezing compartment 42. Particularly, because a temperature of the freezing compartment 42 is increased after time $t_{11}$, the control device 1 estimates a point of time at which the temperature of the freezing compartment 42 reaches an upper limit temperature (ON point). When the estimated time is time $t_{12}$, the control device 1 controls the RPM of the compressor 60 under the constraint condition in which a temperature of the refrigerating compartment 41 reaches a lower limit temperature (OFF point) until time $t_{12}$. Because the temperature of the refrigerating compartment 41 is increased after time $t_{12}$, the control device 1 estimates a point of time at which the temperature of the refrigerating compartment 41 reaches an upper limit temperature (ON point). When the estimated time is time $t_{14}$, the control device 1 controls the RPM of the compressor 60 under the constraint condition in which the temperature of the freezing compartment 42 reaches a lower limit temperature (OFF point) until time $t_{14}$. However, when it is assumed that the temperature of the freezing compartment 42 reaches the OFF point at time $t_{13}$ earlier than the target time 14, the operation of the compressor 60 is stopped from time $t_{13}$ to time 14. Further, when the load balances of the refrigerating compartment 41 and the freezing compartment 42 are significantly different from each other, timing may be adjusted by performing the cooling cycle on a compartment requiring the cooling, integer number of times until the compartment having the temperature increased between the refrigerating compartment 41 and the freezing compartment 42 reaches the upper limit temperature (ON point). In the example of FIG. 9, when the refrigeration cycle is configured to alternately cool the first storage compartment and the second storage compartment, the constraint condition is that any one of the first storage compartment and the second storage compartment is decreased to reach the predetermined temperature until the other of the first storage compartment and the second storage compartment is increased to reach the predetermined temperature. As mentioned above, by cooling the refrigerating compartment 41 and the freezing compartment 42, the refrigerator 10 optimizes the evaporation temperature, and thus it is possible to realize the energy saving while making the refrigerating compartment 41 highly humidified.

Figure 10:
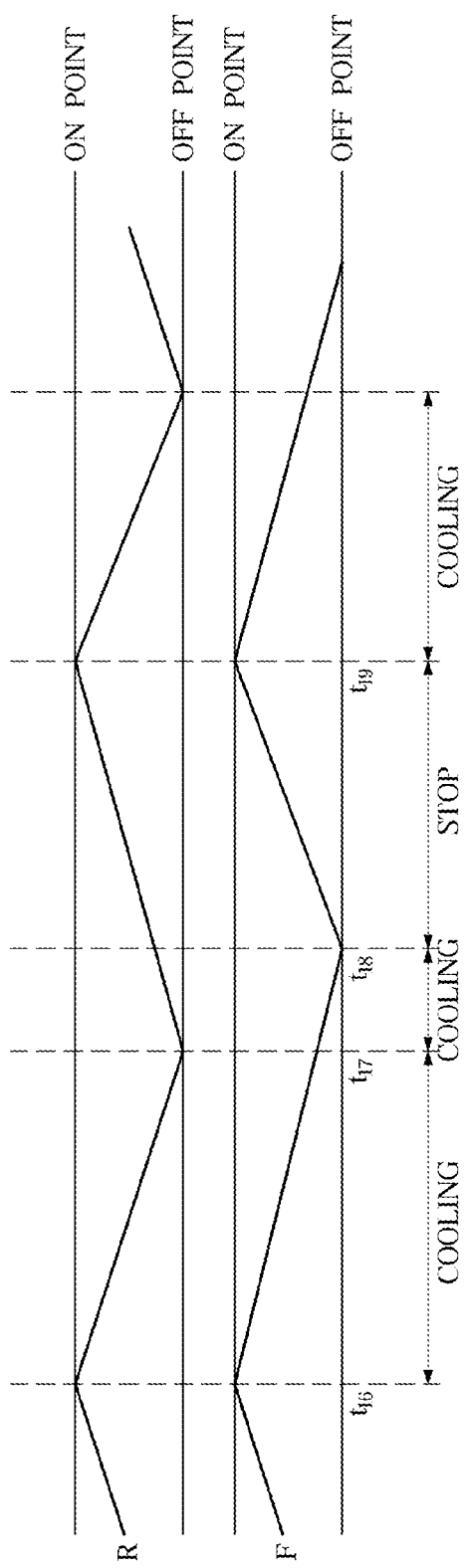
FIG. 10 is a graph illustrating a temperature change in a state in which the refrigerating compartment and the freezing compartment are simultaneously cooled by using the refrigeration cycle in the first application example of an embodiment of the disclosure.

FIG. 10 is a graph illustrating a temperature change in a state in which the refrigerating compartment 41 and the freezing compartment 42 are simultaneously cooled by using the refrigeration cycle 100. In the graph, a vertical axis represents a temperature, "R" represents a change in the temperature of the refrigerating compartment 41, and "F" represents a change in the temperature of the freezing compartment 42. In this case, the control device 1 simultaneously starts cooling the refrigerating compartment 41 and the freezing compartment 42, and adjusts the cooling ability to allow the increase of the temperature of the refrigerating compartment 41 and the freezing compartment 42 to be simultaneously terminated. Particularly, the control device 1 starts simultaneously cooling of the refrigerating compartment 41 and the freezing compartment 42 at time $t_{16}$, and when the temperature of the refrigerating compartment 41 reaches a lower limit temperature (OFF point) at time $t_{17}$, the control device 1 starts cooling only the freezing compartment 42. At this time, the control device 1 estimates a point of time at which the temperature of the refrigerating compartment 41 reaches an upper limit temperature (ON point). When the estimated time is time $t_{19}$, the control device 1 controls the RPM of the compressor 60 under the constraint condition in which a temperature of the freezing compartment 42 reaches an upper limit temperature (ON point) until time $t_{19}$. That is, when the temperature of the freezing compartment 42 reaches a lower limit temperature (OFF point) at time $t_{18}$, the control device 1 estimates that the temperature thereof is increased and reaches ON point at time $t_{19}$ and adjusts the RPM of the compressor 60. Further, when the load balances of the refrigerating compartment 41 and the freezing compartment 42 are significantly different from each other, timing may be adjusted by performing the cooling cycle on one of the refrigerating compartment 41 or the freezing compartment 42, integer number of times until the other of the refrigerating compartment 41 or the freezing compartment 42 reaches the lower limit temperature (OFF point). In the example of FIG. 10, when the refrigeration cycle is configured to simultaneously cool the first storage compartment and the second storage compartment, the constraint condition is that any one of the first storage compartment and the second storage compartment is increased to reach the predetermined temperature until the other of the first storage compartment and the second storage compartment is increased to reach the predetermined temperature. As mentioned above, by cooling the refrigerating compartment 41 and the freezing compartment 42, the refrigerator 10 may realize the energy saving by setting the RPM of the compressor 60 to be slightly lowered.

Figure 11:
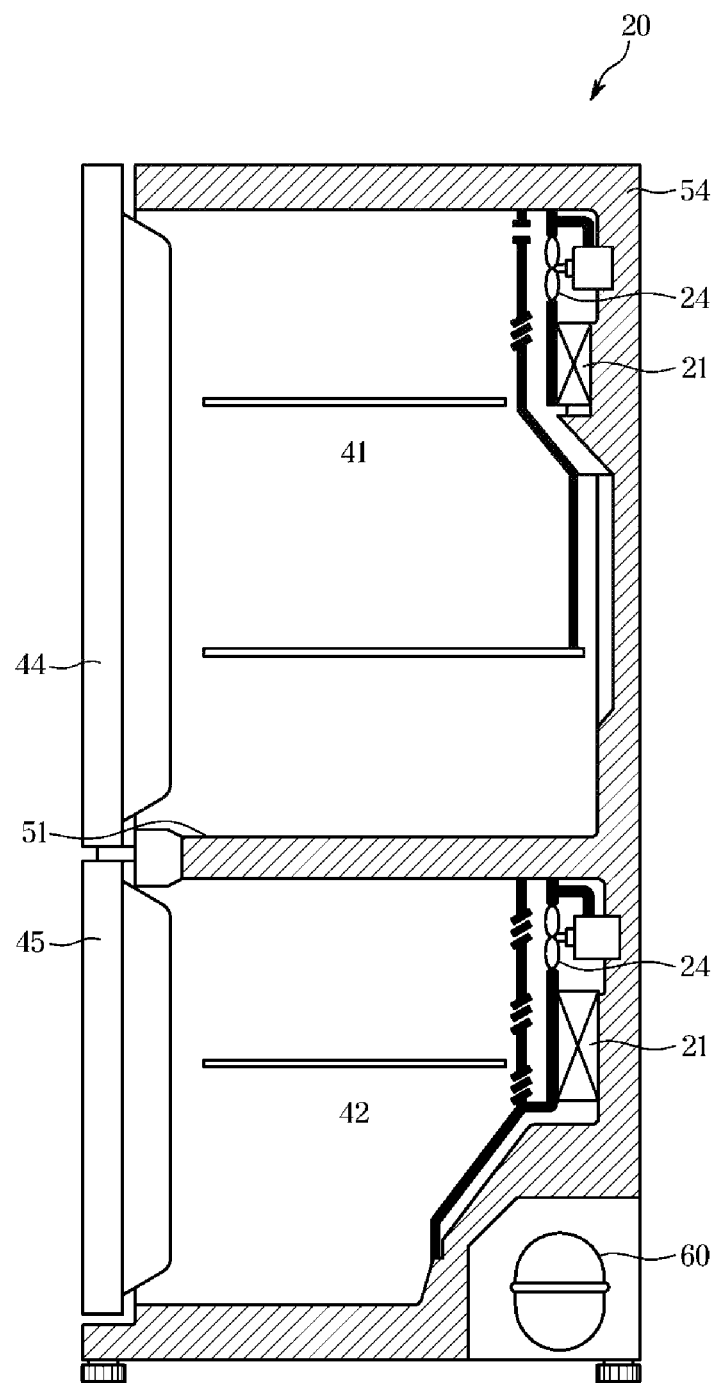
FIG. 11 is a view illustrating an example of an overall configuration of a refrigerator according to a second application example of an embodiment of the disclosure.

FIG. 11 is a view illustrating an example of an overall configuration of a refrigerator 20 to which an embodiment is applied. As illustrated in the FIG. 11, the refrigerator 20 includes a refrigerating compartment 41 as an example of a storage compartment and a first storage compartment formed in the upper portion of the inside of the refrigerator, and a freezing compartment 42 as an example of a storage compartment and a second storage compartment formed in the lower portion of the inside of the refrigerator. The refrigerator 20 includes a compressor 60 compressing and circulating a refrigerant. The refrigerating compartment 41 includes a refrigerating evaporator 21 evaporating the refrigerant circulated by the compressor 60 to cool the refrigerating compartment 41, and a refrigerating fan 24 blowing the air cooled by the refrigerating evaporator 21 to the refrigerating compartment 41. The freezing compartment 42 includes a freezing evaporator 22 evaporating the refrigerant circulated by the compressor 60 to cool the freezing compartment 42, and a freezing fan 25 blowing the air cooled by the freezing evaporator 22 to the freezing compartment 42. The refrigerator 20 includes a refrigerating compartment door 44 opened and closed for storing foods into the refrigerating compartment 41, a freezing compartment door 45 opened and closed to store foods into the freezing compartment 42, an intermediate partition wall 51 separating the refrigerating compartment 41 from the freezing compartment 42 and a rear wall 54 installed in the rear side cross over the refrigerating compartment 41 to the freezing compartment 42.

Figure 12:
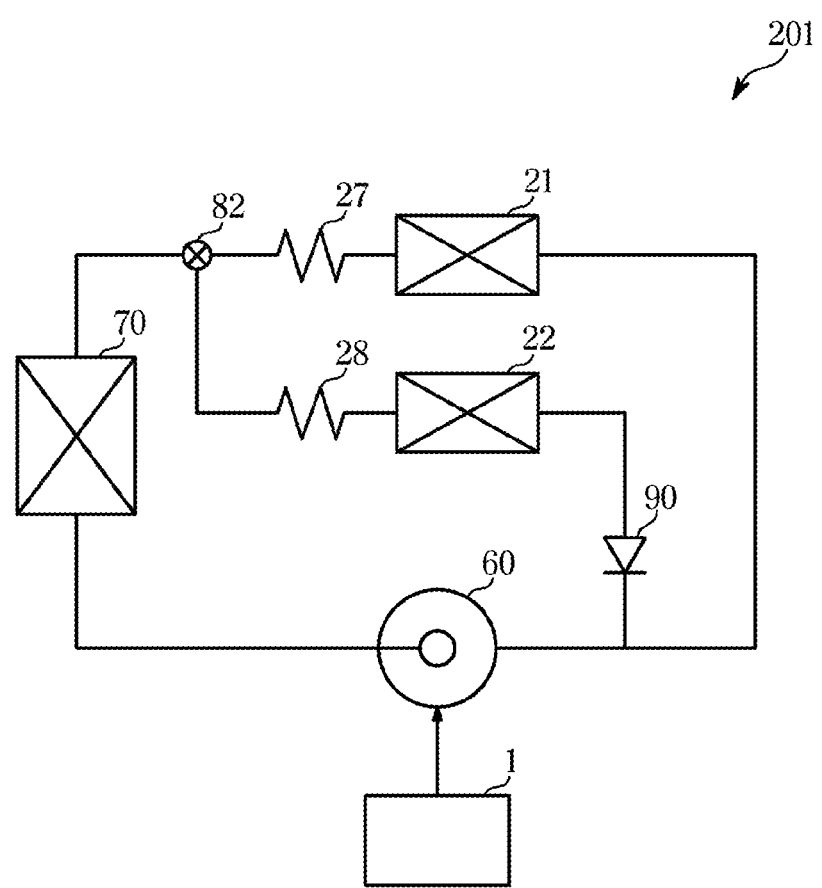
FIG. 12 is a view illustrating an example of a configuration of a first refrigeration cycle in the second application example of an embodiment of the disclosure.

FIG. 12 is a view illustrating a configuration of a refrigeration cycle 201 corresponding to an example of a refrigeration cycle device embedded in the refrigerator 20. As illustrated in FIG. 12, the refrigeration cycle 201 includes a compressor 60 circulating a refrigerant and a condenser 70 condensing the refrigerant circulated by the compressor 60. Further, the refrigerating evaporator 21 evaporating the refrigerant circulated by the compressor 60 to cool the refrigerating compartment 41 and the freezing evaporator 22 evaporating the refrigerant circulated by the compressor 60 to cool the freezing compartment 42 are connected in parallel to each other in the condenser 70. That is, an expansion valve 82 configured to switch the evaporator, which sends the refrigerant condensed by the condenser 70, between the refrigerating evaporator 21 and the freezing evaporator 22 is installed. Further, an outlet side of the refrigerating evaporator 21 and an outlet side of the freezing evaporator 22 are connected to the compressor 60.

Further, a refrigerating capillary tube 27 expending the refrigerant flowing from the refrigerating evaporator 21 is connected to an inlet side of the refrigerating evaporator 21. A freezing capillary tube 28 expending the refrigerant flowing from the freezing evaporator 22 is connected to an inlet side of the freezing evaporator 22.

In addition, between the freezing evaporator 22 and the compressor 60, a check valve 90 configured to prevent the refrigerant from flowing back from the high pressure side of the refrigeration cycle 201 to the freezing evaporator 22 is installed to be directed to the compressor 60.

In addition, the refrigeration cycle 201 includes the control device 1 described with reference to FIGS. 1 to 6. In this case, based on the present value of the internal temperature and the external temperature of the refrigerator, the control device 1 identifies a command value of at least one compartment among the RPM of the compressor 60, the opening degree of the expansion valve 82, and the RPM of the fan 14, which satisfy the constraint condition and minimize the power consumption, at the predetermined period. The control device 1 drives the corresponding component by using the command value.

In the above description, the expansion valve 82 is provided for switching the evaporator that sends the refrigerant condensed by the condenser 70, but a switching valve may be provided instead of the expansion valve 82.

Figure 13:
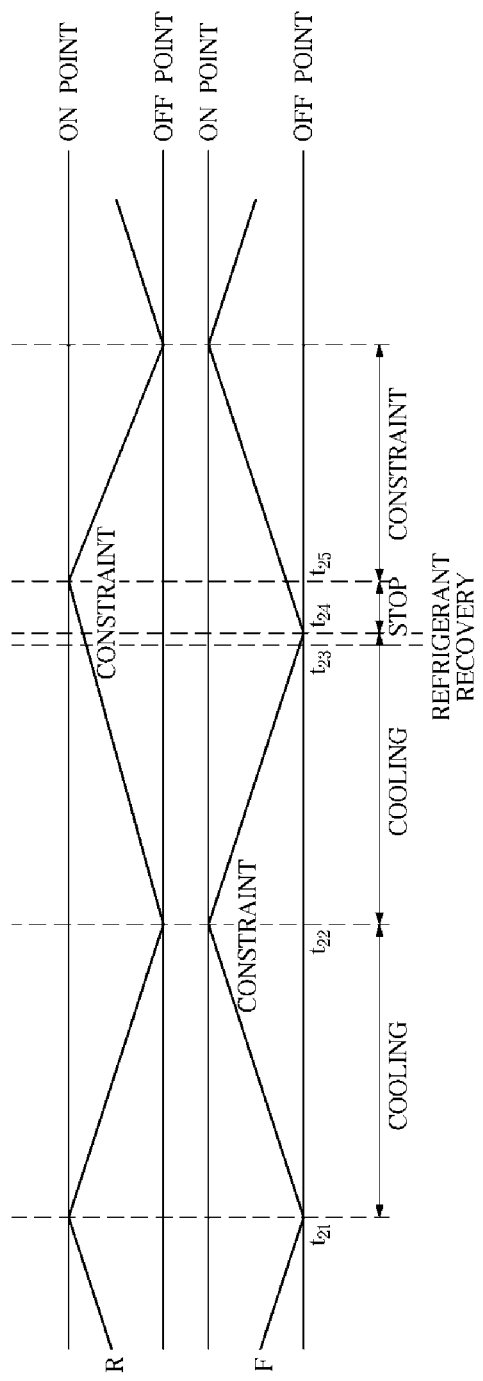
FIG. 13 is a graph illustrating a temperature change in a state in which the refrigerating compartment and the freezing compartment are cooled by using the first refrigeration cycle in the second application example of an embodiment of the disclosure.

FIG. 13 is a graph illustrating a temperature change in a state in which the refrigerating compartment 41 and the freezing compartment 42 are cooled by using the refrigeration cycle 201. In the graph, a vertical axis represents a temperature, "R" represents a change in the temperature of the refrigerating compartment 41, and "F" represents a change in the temperature of the freezing compartment 42. In this case, the control device 1 controls the cooling capacity in such a way that timing for a compartment in which cooling is performed is adjusted for a compartment in which a temperature thereof is increased between the refrigerating compartment 41 and the freezing compartment 42. Particularly, because a temperature of the freezing compartment 42 is increased after time $t_{21}$, the control device 1 estimates a point of time at which the temperature of the freezing compartment 42 reaches an upper limit temperature (ON point). When the estimated time is time $t_{22}$, the control device 1 controls the RPM of the compressor 60 under the constraint condition in which a temperature of the refrigerating compartment 41 reaches a lower limit temperature (OFF point) until time $t_{22}$. Because the temperature of the refrigerating compartment 41 is increased after time $t_{22}$, the control device 1 estimates a point of time at which the temperature of the refrigerating compartment 41 reaches an upper limit temperature (ON point). When the estimated time is time $t_{25}$, the control device 1 controls the RPM of the compressor 60 under the constraint condition in which the temperature of the freezing compartment 42 reaches a lower limit temperature (OFF point) until time $t_{25}$ However, when it is assumed that the temperature of the freezing compartment 42 reaches the OFF point at time $t_{24}$ earlier than the target time 25, the operation of the compressor 60 is stopped from time $t_{24}$ to time 25. The refrigerator 20 performs a refrigerant recovery operation by switching the evaporator sending the refrigerant from the freezing evaporator 22 to the refrigerating evaporator 21 from time $t_{23}$ to time $t_{24}$. Further, when the load balances of the refrigerating compartment 41 and the freezing compartment 42 are significantly different from each other, timing may be adjusted by performing the cooling cycle on the compartment requiring the cooling, integer number of times until the compartment having the temperature increased between the refrigerating compartment 41 and the freezing compartment 42 reaches the upper limit temperature (ON point). In the example of FIG. 13, when the refrigeration cycle is configured to alternately cool the first storage compartment and the second storage compartment, the constraint condition is that any one of the first storage compartment and the second storage compartment is decreased to reach the predetermined temperature until the other of the first storage compartment and the second storage compartment is increased to reach the predetermined temperature. As mentioned above, by cooling the refrigerating compartment 41 and the freezing compartment 42, it is possible to realize the energy saving by minimizing the switching of the evaporator, which causes the loss of the energy, as much as the amount necessary for the refrigerant recovery operation and for cooling the warmed evaporator.

Figure 14:
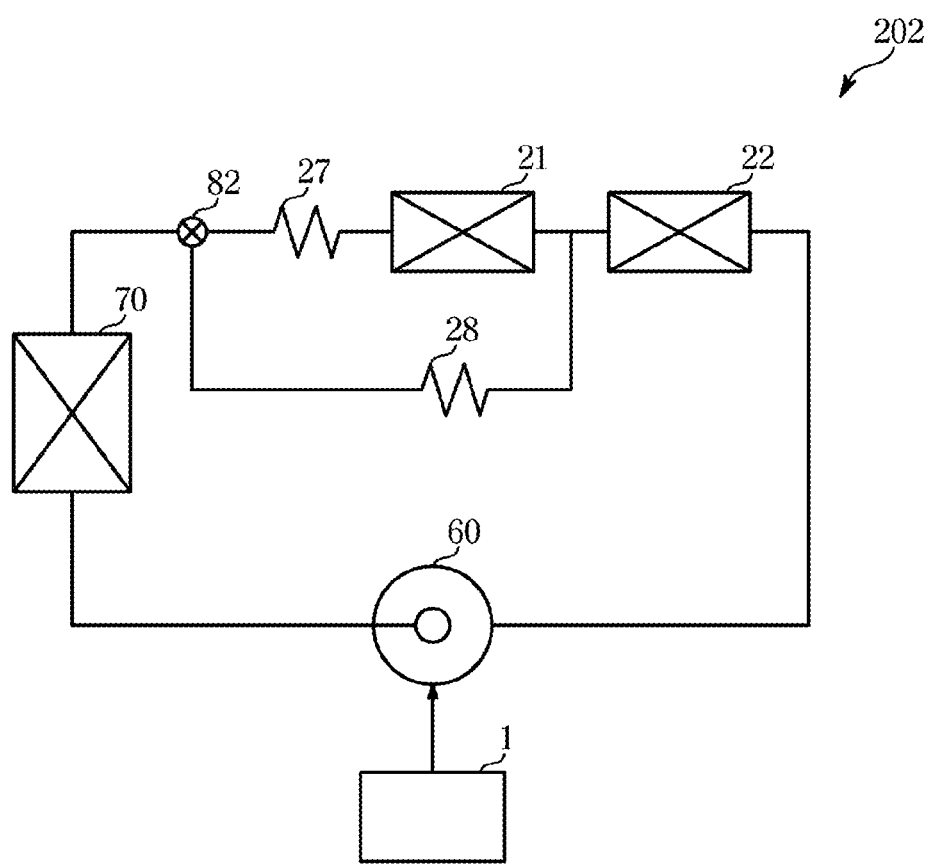
FIG. 14 is a view illustrating an example of a configuration of a second refrigeration cycle in the second application example of an embodiment of the disclosure.

FIG. 14 is a view illustrating a configuration of a refrigeration cycle 202 corresponding to another example of a refrigeration cycle device embedded in the refrigerator 20. As illustrated in FIG. 14, the refrigeration cycle 202 includes a compressor 60 circulating a refrigerant and a condenser 70 condensing the refrigerant circulated by the compressor 60. Further, a refrigerating evaporator 21 evaporating the refrigerant circulated by the compressor 60 to cool the refrigerating compartment 41 and a freezing evaporator 22 evaporating the refrigerant circulated by the compressor 60 to cool the freezing compartment 42 are connected in series with each other in the condenser 70. That is, an expansion valve 82 configured to switch an evaporator, which sends the refrigerant condensed by the condenser 70, between both side of the refrigerating evaporator 21 and the freezing evaporator 22, and only the freezing evaporator 22 side, is installed. Further, an outlet side of the refrigerating evaporator 21 is connected to an inlet side of the freezing evaporator 22. An outlet side of the freezing evaporator 22 is connected to the compressor 60.

Further, a refrigerating capillary tube 27 expending the refrigerant flowing from the refrigerating evaporator 21 is connected to an inlet side of the refrigerating evaporator 21. A freezing capillary tube 28 expending the refrigerant flowing from the freezing evaporator 22 is connected to an inlet side of the freezing evaporator 22.

In addition, the refrigeration cycle 202 includes the control device 1 described with reference to FIGS. 1 to 6. In this case, based on the present value of the internal temperature and the external temperature of the refrigerator, the control device 1 identifies a command value of at least one compartment among the RPM of the compressor 60, the opening degree of the expansion valve 82 and the RPM of the fan 14, which satisfy the constraint condition and minimize the power consumption, at the predetermined period. The control device 1 drives the corresponding component by using the command value.

In the above description, the expansion valve 82 is provided for switching the evaporator that sends the refrigerant condensed by the condenser 70, but a switching valve may be provided instead of the expansion valve 82.

Figure 15:
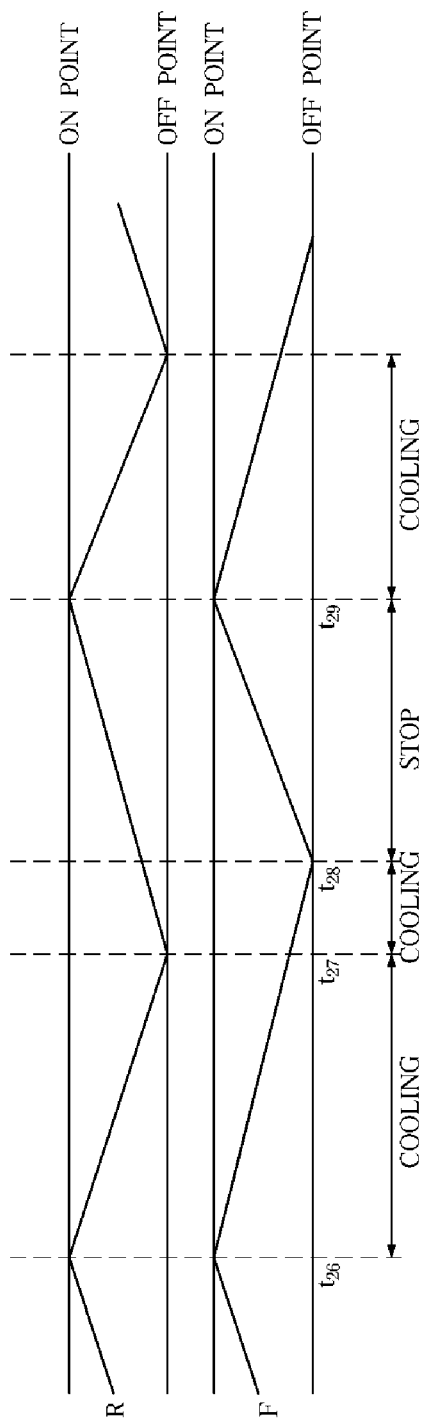
FIG. 15 is a graph illustrating a temperature change in a state in which the refrigerating compartment and the freezing compartment are cooled by using the second refrigeration cycle in the second application example of an embodiment of the disclosure.

FIG. 15 is a graph illustrating a temperature change in a state in which the refrigerating compartment 41 and the freezing compartment 42 are cooled by using the refrigeration cycle 202. In the graph, a vertical axis represents a temperature, "R" represents a change in the temperature of the refrigerating compartment 41, and "F" represents a change in the temperature of the freezing compartment 42. In this case, the control device 1 simultaneously starts cooling the refrigerating compartment 41 and the freezing compartment 42, and adjusts the cooling ability to allow the increase of the temperature of the refrigerating compartment 41 and the freezing compartment 42 to be simultaneously terminated. Particularly, the control device 1 starts simultaneously cooling of the refrigerating compartment 41 and the freezing compartment 42 at time $t_{26}$, and when the temperature of the refrigerating compartment 41 reaches a lower limit temperature (OFF point) at time $t_{27}$, the control device 1 starts cooling only the freezing compartment 42. At this time, the control device 1 estimates a point of time at which the temperature of the refrigerating compartment 41 reaches an upper limit temperature (ON point). When the estimated time is time $t_{29}$, the control device 1 controls the RPM of the compressor 60 under the constraint condition in which a temperature of the freezing compartment 42 reaches an upper limit temperature (ON point) until time $t_{29}$. That is, when the temperature of the freezing compartment 42 reaches a lower limit temperature (OFF point) at time $t_{28}$, the control device 1 estimates that the temperature thereof is increased and reaches ON point at time $t_{29}$ and adjusts the RPM of the compressor 60. Further, when the load balances of the refrigerating compartment 41 and the freezing compartment 42 are significantly different from each other, timing may be adjusted by performing the cooling cycle on one of the refrigerating compartment 41 and the freezing compartment 42, integer number of times until the other the refrigerating compartment 41 and the freezing compartment 42 reaches the lower limit temperature (OFF point). In the example of FIG. 15, when the refrigeration cycle is configured to simultaneously cool the first storage compartment and the second storage compartment, the constraint condition is that any one of the first storage compartment and the second storage compartment is increased to reach the predetermined temperature until the other of the first storage compartment and the second storage compartment is increased to reach the predetermined temperature.

Figure 16:
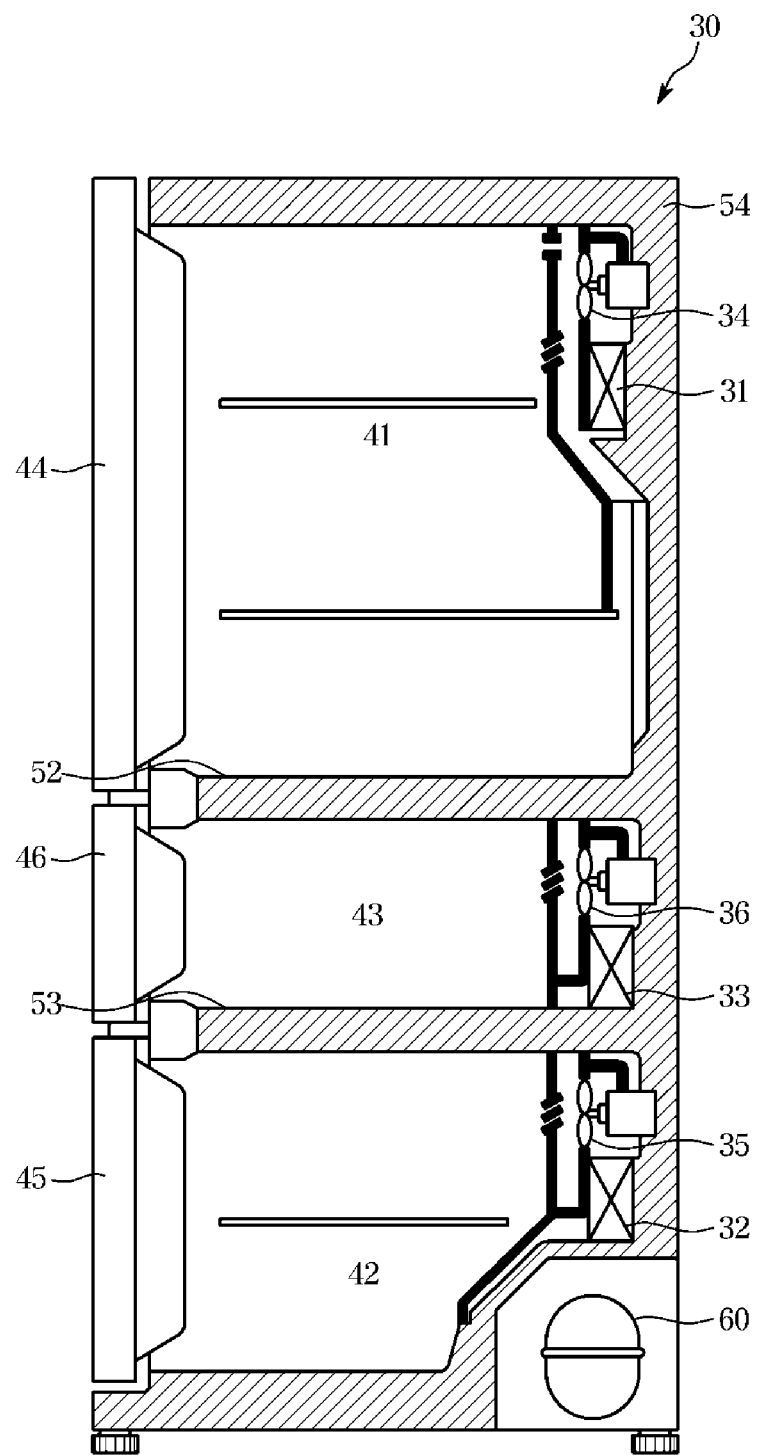
FIG. 16 is a view illustrating an example of an overall configuration of a refrigerator according to a third application example of an embodiment of the disclosure.

FIG. 16 is a view illustrating an example of an overall configuration of a refrigerator 30 to which an embodiment is applied. As illustrated in the FIG. 16, the refrigerator 30 includes a refrigerating compartment 41 as an example of a storage compartment and a first storage compartment formed in the upper portion of the inside of the refrigerator, a freezing compartment 42 as an example of a storage compartment and a second storage compartment formed in the lower portion of the inside of the refrigerator, and a variable temperature compartment 43 as an example of a storage compartment and a second storage compartment formed in the middle portion of the inside of the refrigerator. The refrigerator 30 includes a compressor 60 compressing and circulating a refrigerant. The refrigerating compartment 41 includes a refrigerating evaporator 31 evaporating the refrigerant circulated by the compressor 60 to cool the refrigerating compartment 41, and a refrigerating fan 34 blowing the air cooled by the refrigerating evaporator 31 to the refrigerating compartment 41. The freezing compartment 42 includes a freezing evaporator 32 evaporating the refrigerant circulated by the compressor 60 to cool the freezing compartment 42, and a freezing fan 35 blowing the air cooled by the freezing evaporator 32 to the freezing compartment 42. The variable temperature compartment 43 includes a variable temperature compartment evaporator 33 evaporating the refrigerant circulated by the compressor 60 to cool the variable temperature compartment 43, and a variable temperature compartment fan 36 blowing the air cooled by the variable temperature compartment evaporator 33 to the variable temperature compartment 43. The refrigerator 30 includes a refrigerating compartment door 44 opened and closed for storing foods into the refrigerating compartment 41, a freezing compartment door 45 opened and closed to store foods into the freezing compartment 42, a variable temperature compartment door 46 opened and closed for storing foods into the variable temperature compartment 43, an intermediate partition wall 52 separating the refrigerating compartment 41 from the variable temperature compartment 43, an intermediate partition wall 53 separating the freezing compartment 42 from the variable temperature compartment 43, and a rear wall 54 installed in the rear side cross over the refrigerating compartment 41 to the freezing compartment 42.

Figure 17:
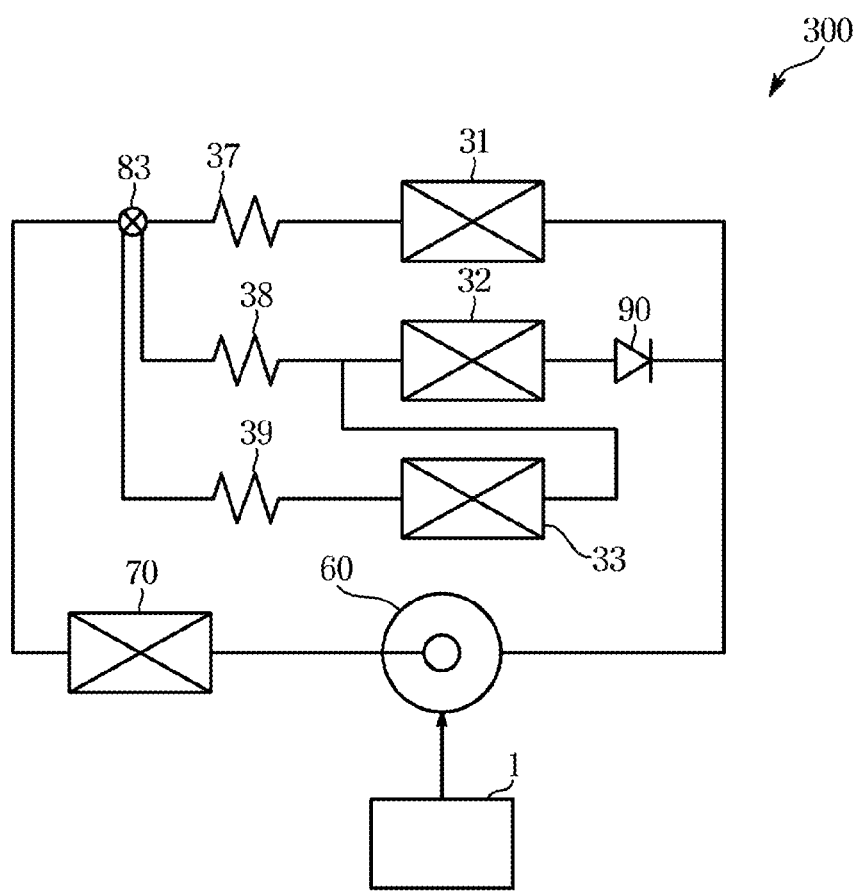
FIG. 17 is a view illustrating an example of a configuration of a refrigeration cycle in the third application example of an embodiment of the disclosure.

FIG. 17 is a view illustrating a configuration of a refrigeration cycle 300 corresponding to another example of a refrigeration cycle device embedded in the refrigerator 30. As illustrated in FIG. 17, the refrigeration cycle 300 includes a compressor 60 circulating a refrigerant and a condenser 70 condensing the refrigerant circulated by the compressor 60. Further, a refrigerating evaporator 31 evaporating the refrigerant circulated by the compressor 60 to cool the refrigerating compartment 41, a freezing evaporator 32 evaporating the refrigerant circulated by the compressor 60 to cool the freezing compartment 42, and a variable temperature compartment evaporator 33 as an example of a third cooler evaporating the refrigerant condensed by the condenser 70 to cool the variable temperature compartment 43 are connected in parallel to each other in the condenser 70. That is, an expansion valve 82 configured to switch an evaporator, which sends the refrigerant condensed by the condenser 70, among the refrigerating evaporator 31, the freezing evaporator 32, and the variable temperature compartment evaporator 33 is installed. Further, an outlet side of the refrigerating evaporator 31 and an outlet side of the freezing evaporator 32 are connected to the compressor 60. An outlet side of the variable temperature compartment evaporator 33 is connected to an inlet side of the freezing evaporator 32.

Further, a refrigerating capillary tube 37 expending the refrigerant flowing from the refrigerating evaporator 31 is connected to an inlet side of the refrigerating evaporator 31. A freezing capillary tube 38 expending the refrigerant flowing from the freezing evaporator 32 is connected to the inlet side of the freezing evaporator 32. A variable temperature compartment capillary tube 39 expending the refrigerant flowing to the variable temperature compartment evaporator 33 is connected to an inlet side of the variable temperature compartment evaporator 33.

In addition, between the freezing evaporator 32 and the compressor 60, a check valve 90 configured to prevent the refrigerant from flowing back from the high pressure side of the refrigeration cycle 300 to the freezing evaporator 32 is installed to be directed to the compressor 60.

In addition, the refrigeration cycle 300 includes the control device 1 described with reference to FIGS. 1 to 6. In this case, based on the present value of the internal temperature and the external temperature of the refrigerator, the control device 1 identifies a command value of at least one compartment among the RPM of the compressor 60, the opening degree of the expansion valve 83, and the RPM of the fan 14, which satisfy the constraint condition and minimize the power consumption, at the predetermined period. The control device 1 drives the corresponding component by using the command value.

In the above description, the expansion valve 83 is provided for switching the evaporator that sends the refrigerant condensed by the condenser 70, but a switching valve may be provided instead of the expansion valve 83.

Figure 18:
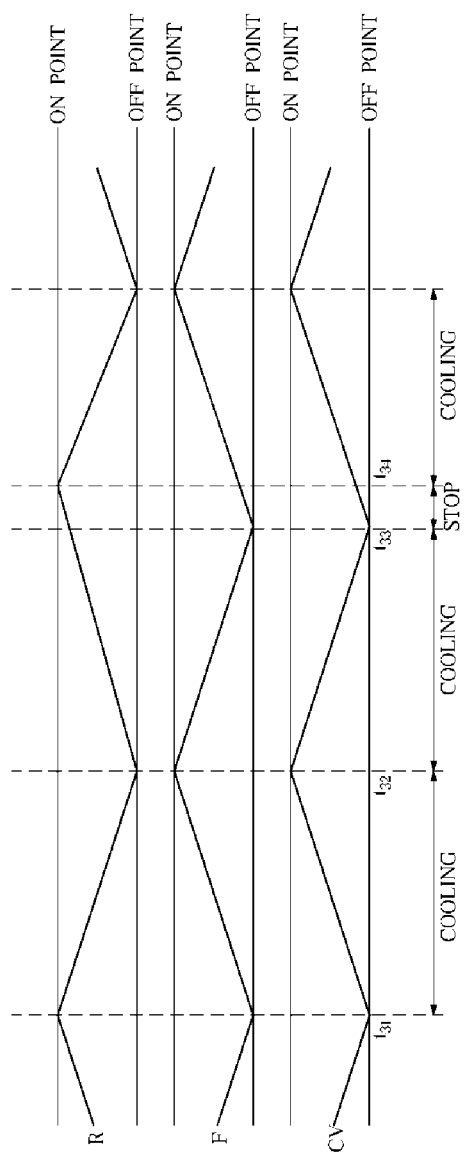
FIG. 18 is a graph illustrating a temperature change in a state in which a refrigerating compartment, and a freezing/variable temperature compartment are cooled by using the refrigeration cycle in the third application example of an embodiment of the disclosure.

FIG. 18 is a graph illustrating a temperature change in a state in which the refrigerating compartment 41, the freezing compartment 42 and the variable temperature compartment 43 (hereinafter referred to as 'freezing/variable temperature compartment) are cooled by using the refrigeration cycle 300. In the graph, a vertical axis represents a temperature, "R" represents a change in the temperature of the refrigerating compartment 41, "F" represents a change in the temperature of the freezing compartment 42, and "CV" represents a change in the temperature of the variable temperature compartment 43. In this case, the control device 1 controls the cooling capacity in such a way that timing for a compartment in which cooling is performed is adjusted for a compartment in which a temperature thereof is increased between the refrigerating compartment 41 and the freezing/variable temperature compartment. Particularly, because a temperature of the freezing/variable temperature compartment is increased after time $t_{31}$, the control device 1 estimates a point of time at which the temperature of the freezing/variable temperature compartment reaches an upper limit temperature (ON point). When the estimated time is time $t_{32}$, the control device 1 controls the RPM of the compressor 60 under the constraint condition in which a temperature of the refrigerating compartment 41 reaches a lower limit temperature (OFF point) until time $t_{32}$. Because the temperature of the refrigerating compartment 41 is increased after time $t_{32}$, the control device 1 estimates a point of time at which the temperature of the refrigerating compartment 41 reaches an upper limit temperature (ON point). When the estimated time is time $t_{34}$, the control device 1 controls the RPM of the compressor 60 under the constraint condition in which the temperature of the freezing/variable temperature compartment reaches a lower limit temperature (OFF point) until time $t_{34}$. However, when it is assumed that the temperature of the freezing/variable temperature compartment reaches the OFF point at time $t_{33}$ earlier than the target time 34, the operation of the compressor 60 is stopped from time $t_{33}$ to time 34. Further, when the load balances of the refrigerating compartment 41 and the freezing/variable temperature compartment are significantly different from each other, timing may be adjusted by performing the cooling cycle on the compartment requiring the cooling, integer number of times until the compartment having the temperature increased between the refrigerating compartment 41 and the freezing/variable temperature compartment reaches the upper limit temperature (ON point). In the example of FIG. 18, when the refrigeration cycle is configured to alternately cool the first storage compartment and the second storage compartment, the constraint condition is that any one of the first storage compartment and the second storage compartment is decreased to reach the predetermined temperature until the other of the first storage compartment and the second storage compartment is increased to reach the predetermined temperature.

As mentioned above, the temperature estimator 5 periodically estimates a temperature change for each RPM of the compressor by using an estimation model based on the present value of the internal temperature and the external temperature of the refrigerator and the entire RPM of the compressor which are input through the acquirer 2, and the temperature estimator 5 inputs the temperature change to the controller 7. Hereinafter estimation of the temperature change in the temperature estimator 5 will be described in details.

It is assumed that the transfer function model is used as the estimation model. That is, it is assumed that the RPM of the compressor 60 (hereinafter simply referred to as "the RPM of the compressor") or the outside air temperature is an input U (s), an internal temperature of the refrigerating compartment 41 (hereinafter simply referred to as "refrigerating compartment temperature") or an internal temperature of the freezing compartment 42 (hereinafter simply referred to as "freezing compartment temperature") is an output Y(s), and an estimation model is a transfer function G (s). Accordingly, the output Y(s) is derived from the input U (s) using the transfer function G (s), as shown in equation 1.

$$Y(s) = G(s) \times U(s) \quad \text{Equation 1}$$

Further, in this case, the estimation model is divided into four models (model #1 to model #4).

Figure 19:
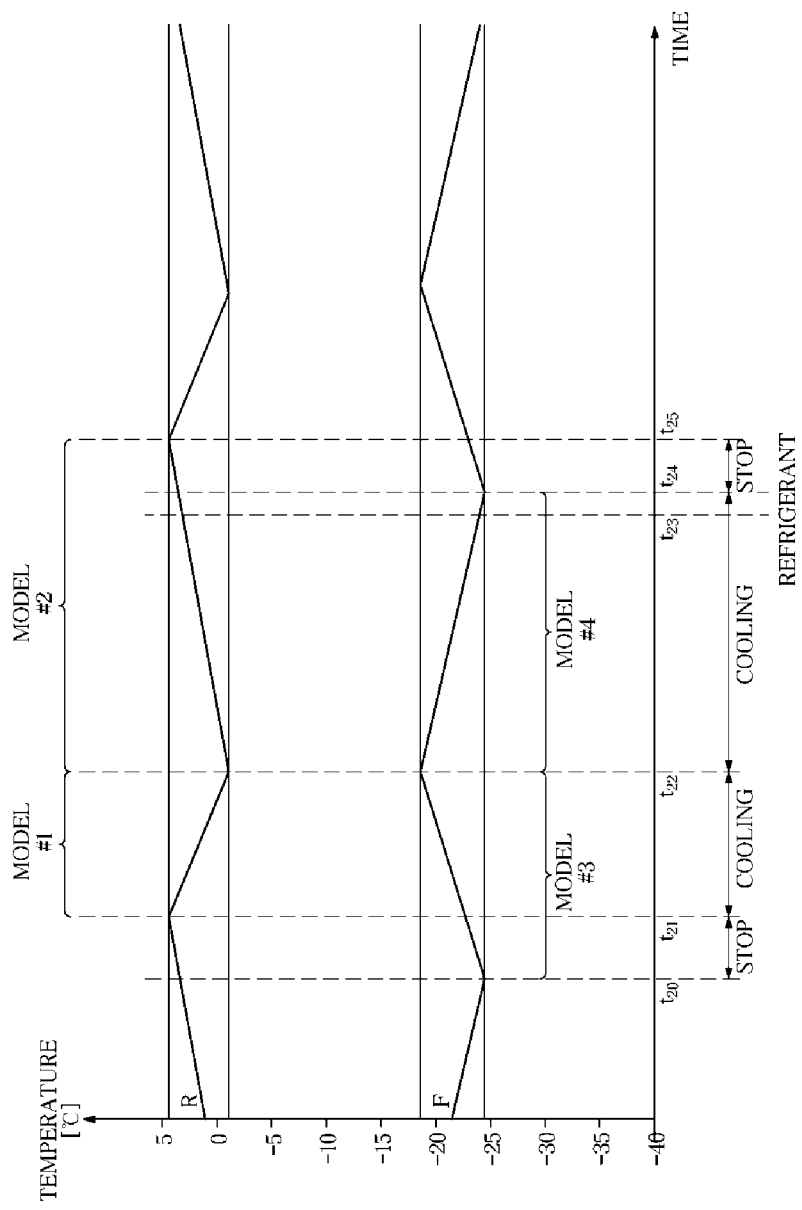
FIG. 19 is a view illustrating the temperature change in the refrigerating compartment and the freezing compartment in the second application example, particularly, illustrating how to estimate the temperature change by using any model at any section.

FIG. 19 is a view illustrating the temperature change in the refrigerating compartment 41 and the freezing compartment 42 in the second application example, particularly, illustrating how to estimate the temperature change by using any model at any section. In the graph, a vertical axis represents a temperature, "R" represents a change in the temperature of the refrigerating compartment 41, and "F" represents a change in the temperature of the freezing compartment 42. The determination of the constraint condition and the control of the temperature based on the constraint condition have already been described with reference to FIG. 13, and a description thereof will be omitted.

As illustrated in FIG. 19, the model #1 is used to estimate the temperature change of the refrigerating compartment 41 in a section from time $t_{21}$ to time $t_{22}$. This section is a section in which the refrigerating compartment 41 is cooled by the operation of the compressor 60. Therefore, in this section, the transfer function G (s) is set as the model #1, the input U (s) is set as the RPM of the compressor, and the output Y (s) is set as the refrigerating compartment temperature.

The model #2 is used to estimate the temperature change of the refrigerating compartment 41 in a section from time $t_{22}$ to time $t_{25}$. This section is a section in which the refrigerating compartment 41 is not cooled. Therefore, in this section, the transfer function G (s) is set as the model #2, the input U (s) is set as the outside air temperature, and the output Y (s) is set as the refrigerating compartment temperature.

The model #3 is used to estimate the temperature change of the freezing compartment 42 in a section from time $t_{20}$ to time $t_{22}$. This section is a section in which the freezing compartment 42 is not cooled. Therefore, in this section, the transfer function G (s) is set as the model #3, the input U (s) is set as the outside air temperature, and the output Y (s) is set as the freezing compartment temperature.

The model #4 is used to estimate the temperature change of the freezing compartment 42 in a section from time $t_{22}$ to time $t_{24}$. This section is a section in which the freezing compartment 42 is cooled. Therefore, in this section, the transfer function G (s) is set as the model #4, the input U (s) is set as the RPM of the compressor, and the output Y (s) is set as the freezing compartment temperature.

In general, the transfer function is expressed as an overlap of a plurality of thermal conductions such as the thermal conduction from the inside of the refrigerator to the outside of the refrigerator, the thermal conduction between the refrigerating compartment 41 and the freezing compartment 42, the thermal conduction between the inside of the refrigerator and the machine room, and the thermal conduction between the evaporator and the inside of the refrigerator. Further, a dead time until the refrigerant evaporates in the evaporator through the pipe and a dead time until the cool air is blown from the evaporator by the fan to cool the inside of the refrigerator are added. However, it is assumed that the transfer function G (s) is the transfer function of the first order lag plus dead time, and each model is approximated by this transfer function. For example, the transfer function G (s) is expressed by the following equation 2.

$$G(s) = \frac{K}{T \times s + 1} \times \exp(-L \times s) \quad \text{Equation 2}$$

Figure 20:
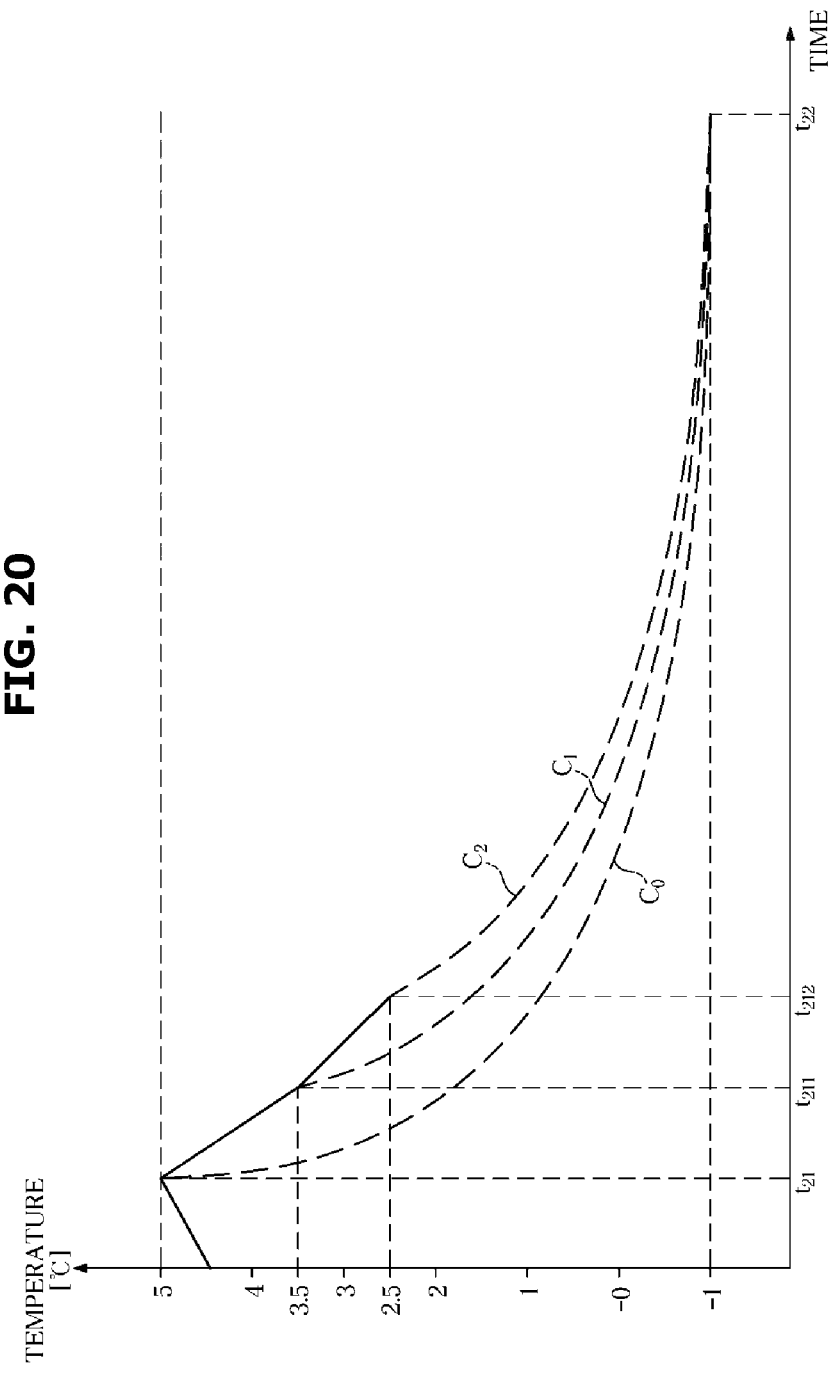
FIG. 20 is a graph particularly illustrating the estimation of the temperature change of the refrigerating compartment.

Next, the temperature estimation using the transfer function G (s) will be described in more detail FIG. 20 is a graph particularly illustrating estimation of the change in the temperature of the refrigerating compartment 41 at the section from time $t_{21}$ to time $t_{22}$ of FIG. 19. In this section, the model #1 is used as described above.

As illustrated, the refrigerating compartment temperature at time $t_{21}$ is identified by the acquirer 2. It is assumed that the refrigerating compartment temperature is 5° C. The temperature estimator 5 obtains an estimation curve $C_0$ of the temperature change based on the refrigerating compartment temperature. Although the estimation curve of the temperature change is actually obtained for each of the RPM of the plurality of compressors, an estimate curve, which is related to the RPM of the compressor having the smallest power consumption among the RPM of the compressor to reach a temperature satisfying the constraint condition at time $t_{22}$, is only illustrated in order to avoid the complication of the graph.

There is no problem when the refrigerating compartment temperature is changed as the estimation curve $C_0$, but when the increase of the thermal load occurs, the refrigerating compartment temperature may be not changed as the estimation curve $C_0$. Therefore, the refrigerating compartment temperature is identified from the acquirer 2 again at time $t_{211}$ that is after a short period. In this case, it is assumed that the refrigerating compartment temperature is 3.5° C. The temperature estimator 5 obtains an estimation curve $C_1$ of the temperature change based on the refrigerating compartment temperature. Although the estimation curve of the temperature change is actually obtained for each of the RPM of the plurality of compressors, an estimate curve, which is related to the RPM of the compressor having the smallest power consumption among the RPM of the compressor to reach a temperature satisfying the constraint condition at time $t_{22}$, is only illustrated in order to avoid the complication of the graph.

In the same manner, the refrigerating compartment temperature is identified from the acquirer 2 again at time $t_{211}$ that is after a short period. In this case, it is assumed that the refrigerating compartment temperature is 2.5° C. The temperature estimator 5 obtains an estimation curve $C_2$ of the temperature change based on the refrigerating compartment temperature. Although the estimation curve of the temperature change is actually obtained for each of the RPM of the plurality of compressors, an estimation curve, which is related to the RPM of the compressor having the smallest power consumption among the RPM of the compressor that is to reach a temperature satisfying the constraint condition at time $t_{22}$, is only illustrated in order to avoid the complication of the graph.

As mentioned above, the temperature estimator 5 repeatedly estimates the temperature change at a short period. The controller 7 controls the RPM of the compressor so that the temperature reaches a temperature satisfying the constraint condition at time $t_{22}$ and the power consumption becomes the smallest. In this case, it is assumed that the refrigerating compartment temperature is changed in a linear shape having a different slope for each period from time $t_{21}$ to time $t_{22}$, as illustrated in FIG. 20. That is, it is illustrated that the refrigerating compartment temperature is changed in a linear shape due to limitations in drawings, but is not limited thereto. Therefore, the refrigerating compartment temperature may be changed in a linear shape having a slope as illustrated in FIG. 20.

For example, when estimating the temperature change at time $t_{212}$, a state of the estimation model, which is used to estimate the temperature change based on the refrigerating compartment temperature of 5° C. obtained from the acquirer 2 at time $t_{211}$ and the refrigerating compartment temperature of 3.5° C. obtained from the acquirer 2 at time $t_{211}$, is used as well as the refrigerating compartment temperature of 2.5° C. obtained from the acquirer 2 at time $t_{212}$. By generalizing this, it is possible to estimate the temperature change at the current actual temperature based on the current actual temperature and the state of the estimation model that is used to estimate the temperature change at the past actual temperature based on the past actual temperature.

To describe the state of the estimation model in this case, a state equation and an output equation corresponding to the transfer function G (s) are illustrated.

The state equation expresses the relationship between the input u (t) and the state vector x (t), and is expressed by equation 3.

$$T\frac{dx(t)}{dt} + x(t) = K \times u(t-L) \qquad \text{Equation 3}$$

The output equation represents the relationship between the state vector x (t) and the output y (t), and is expressed by equation 4.

$$y(t)=x(t) \qquad \text{Equation 4}$$

In the state equation and the output equation, the state vector x (t) corresponds to the state of the estimation model that is used to estimate the temperature change at the past actual temperature based on the past actual temperature. For example, information on the temperature change at the past actual temperature, which is a result of estimation based on the past actual temperature, is reflected to an initial value x (0) of the state vector x (t).

Next, a method of determining parameters in the transfer function G (s) will be described.

When using models #2 and #3, parameter K, T, and L of the transfer function G (s) is obtained by a function of the outside air temperature FK (x), FT(x), and FL (x). In this case, when the functions FK (x), FT (x), and FL (x) are collectively represented by the function F (x), the function F (x) is a general quadratic curve expression. For example, the function F (x) may be expressed by equation 5.

$$F(x)=ax^2+bx+c \qquad \text{Equation 5}$$

Coefficients a to c may be obtained by comparing the temperature change, which is obtained from the state function in which values of the functions FK (x), FT (x), and FL (x), to which the outside air temperature (x) is given that is parameters K, T, and L are set, with the temperature change that is actually observed, and by using least square method.

When using models #1 and #4, parameter K, T, and L of the transfer function G (s) is obtained by a function FK(x, y), FT(x, y) and FL(x, y) of the outside air temperature (x) and the RPM of the compressor (y). In this case, when the functions FK(x, y), FT(x, y) and FL (x, y) are collectively represented by the function F (x, y), the function F (x, y) is a general quadratic curved surface expression. For example, the function F (x, y) may be expressed by equation 6.

$$F(x,y)=ax^2+bxy+cy^2+dy+ex+f \qquad \text{Equation 6}$$

Coefficients a to f may be obtained by comparing the temperature change, which is obtained from the state function in which values of the functions FK(x, y), FT(x, y) and FL(x, y), to which the outside air temperature (x) and the RPM of the compressor (y) are given, that is parameters K, T, and L are set, with the temperature change that is actually observed, and by using least square method.

In addition, the equations of the functions F(x) and F(x, y) are merely examples, but are not limited thereto. For example, if there is an equation of a curve or a curved surface that makes the approximation with the actually observed temperature change higher, this equation may be used for the equation of the curve or a curved surface. Alternatively, different equations may be used for each section, and equations of straight lines or planes that simply interpolate observed points may be used instead of equations of curves or curved surfaces.

Figure 21:
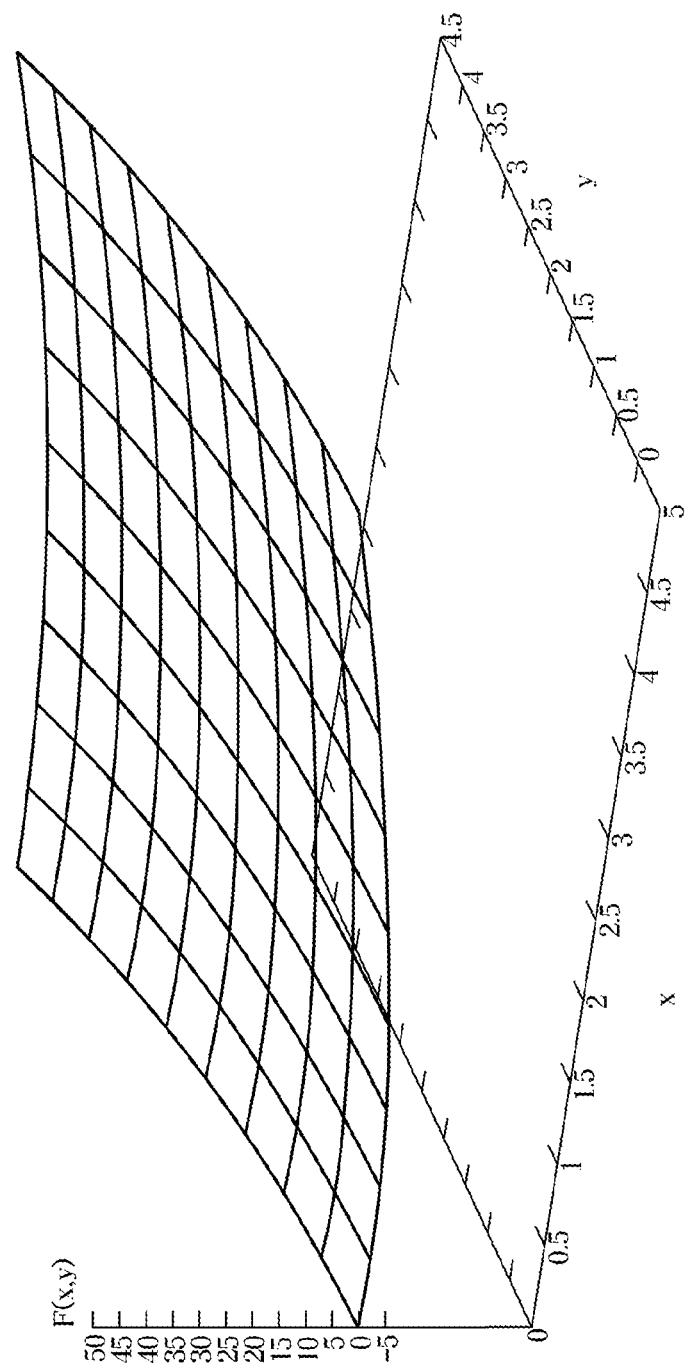
FIG. 21 is a view illustrating an example of a quadratic curved surface of a function for determining parameters of a transfer function.

FIG. 21 is a view illustrating an example of a quadratic curved surface of the function F (x, y). Although FIG. 21 illustrates a quadratic curved surface of the function F (x, y) representing the functions FK(x, y), FT(x, y) and FL(x, y) as the same shaped quadratic curved surface, a quadratic curved surface of the function FK (x, y), a quadratic curved surface of the function FT (x, y) and a quadratic curved surface of the function FL (x, y) have different shapes. As mentioned above, the shape of the quadratic curved surface of the function FK(x, y), FT(x, y) and FL(x, y) are determined by giving some data as the outside air temperature (x) and the RPM of the compressor (y) upon training. When estimating the temperature change, a value of the functions FK(x, y), FT(x, y) and FL(x, y) that is parameters K, T, and L are obtained by giving an outside air temperature and the RPM of the compressor at a point of time, as the outside air temperature (x) and the RPM of the compressor (y).

Although the quadratic curve of the function F (x) is not shown, the shape of the quadratic curved surface of the function FK(x), FT(x) and FL(x) are determined by giving some data as the outside air temperature (x) and the RPM of the compressor (y) upon training.

In the above description, the case where the temperature estimator 5 periodically estimates the temperature change using the estimation model has been described. However, it is assumed that a case where the power estimator 6 periodically estimates the power consumption using the estimation model is performed in the same manner.

According to the embodiment, even when there is disturbance that cannot be estimated in advance (for example, opening and closing of the door, and putting food), the RPM of the compressor 60 for reducing power consumption may be autonomously set in accordance with the temperature change due to the disturbance. That is, it is possible to autonomously change the RPM of the compressor 60 in accordance with the difference between the estimated temperature change and the actual temperature change.

In addition, by estimating the RPM of the compressor 60 every estimation period, it is possible to autonomously realize the operation in consideration of the usage method (food to be put), and to reduce the power consumption.

These effects will be described in more detail.

Figure 22A:
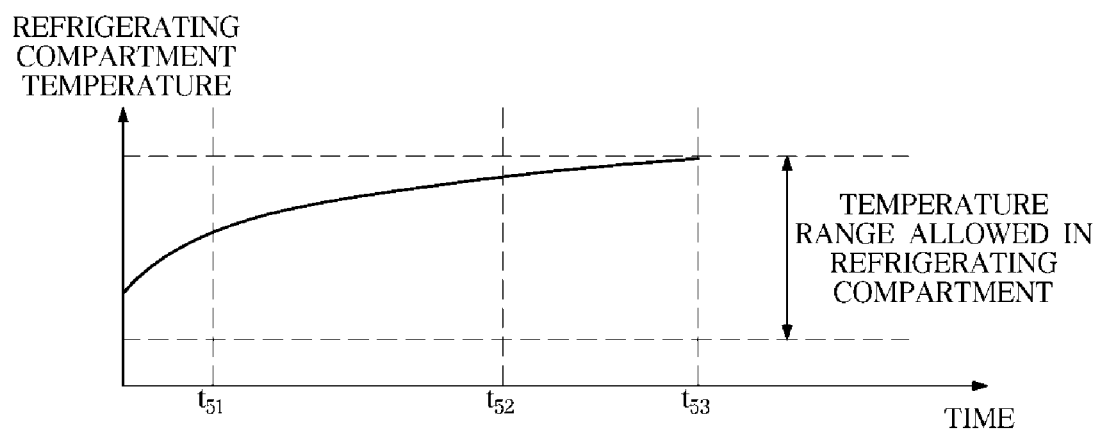
FIGS. 22A-22C are graphs illustrating a change in the temperature of the refrigerating compartment, a change in the temperature of the freezing compartment and a change in the RPM of the compressor.
Figure 22B:
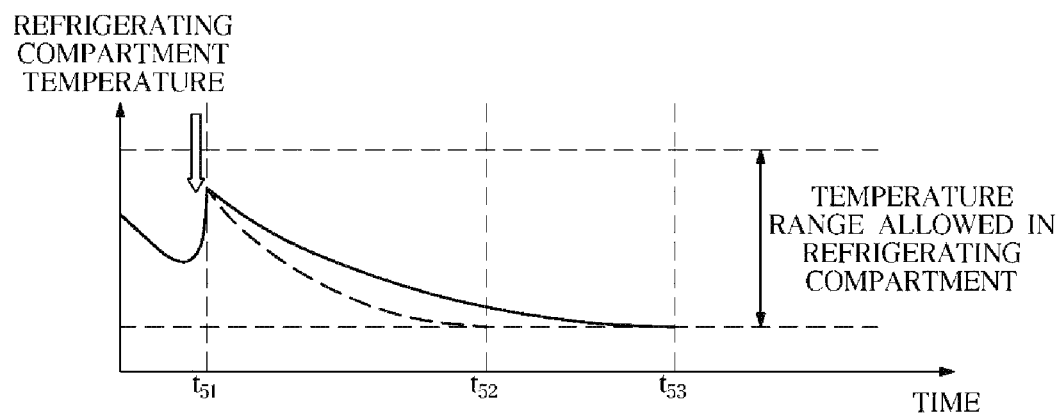
Figure 22C:
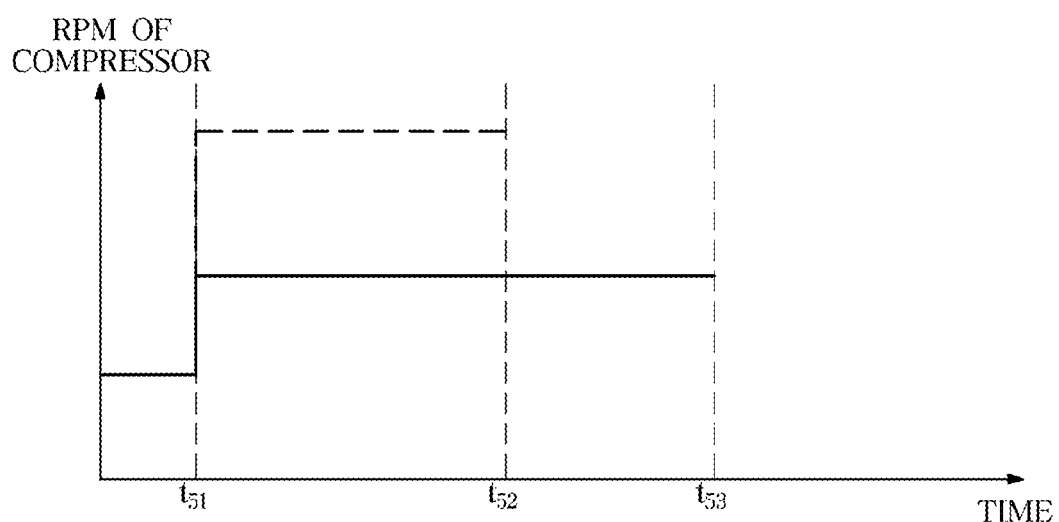

FIG. 22A is a graph illustrating a change in the temperature of the refrigerating compartment, FIG. 22B is a graph illustrating a change in the temperature of the freezing compartment, and FIG. 22C is a graph a change in the RPM of the compressor. As indicated by a white arrow in FIG. 22B, it is assumed that the freezing compartment door 45 is opened and food is put into the freezing compartment 42 immediately before time $t_{s1}$. That is, it is assumed that the thermal load on the freezing compartment 42 is increased. In this case, because the temperature in the freezing compartment is instantly increased, the temperature in the freezing compartment is decreased by increasing the RPM of the compressor 60.

However, according to the conventional technology, the RPM of the compressor 60 is determined in accordance with the maximum value assumed as the thermal load, as indicated by the broken line in FIG. 22C. Therefore, even when the temperature in the refrigerating compartment reaches the upper limit of the temperature range allowed in the refrigerating compartment 41 at time $t_{s3}$ as shown in FIG. 22A, the temperature in the freezing compartment reaches the lower limit of the temperature range allowed by the freezing compartment 42 at the time $t_{s2}$ earlier than the time $t_{s3}$, as indicated by the broken line in FIG. 22B, and thus it is difficult to achieve the energy saving.

On the other hand, according to an embodiment, the thermal load is estimated in a short period and the RPM of the compressor 60 is determined in accordance with the estimated load, as indicated by the solid line in FIG. 22C. Therefore, when the temperature in the refrigerating compartment reaches the upper limit of the temperature range allowed in the refrigerating compartment 41 at time $t_{s3}$ as illustrated in FIG. 22A, the temperature in the freezing compartment may reach the lower limit of the temperature range allowed by the freezing compartment 42 at time $t_{s3}$, as illustrated by the solid line in FIG. 22B and it is possible to achieve the energy saving.

Figure 23:
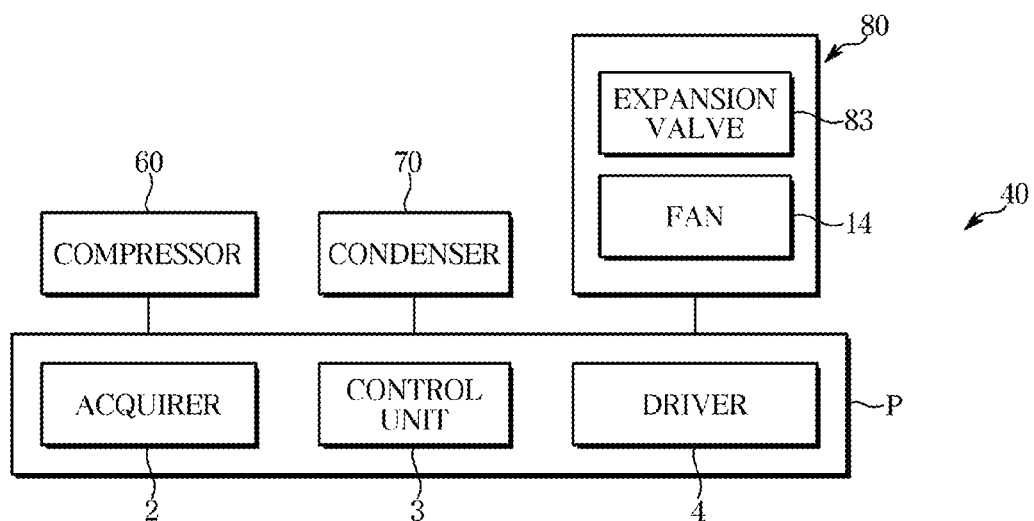
FIG. 23 is a control block diagram illustrating a refrigerator according to an embodiment of the disclosure.

FIG. 23 is a control block diagram of a refrigerator 40 according to an embodiment of the disclosure.

Referring to FIG. 23, a refrigerator 40 according to an embodiment includes a compressor 60, a condenser 70, a cooling component 80, an obtain r 2, a control unit 3 and a driver 4.

The obtain r 2, the control unit 3 and the driver 4 may be provided as at least one processor P.

The compressor 60 may be provided with a configuration for circulating the refrigerant. The RPM of the compressor 60 may be changed by at least one processor P.

The cooling component 80 may include an expansion valve 83 and a fan 14.

At least one processor P may obtain the load variation of the storage compartment of the refrigerator including the refrigeration cycle, and may identify a drive value for driving the components constituting the refrigeration cycle based on the load variation.

The at least one processor P may drive the cooling component based on the drive value. Further, the at least one processor P may obtain the load variation over time during at least one cooling cycle in which the refrigeration cycle cools the storage compartment. In addition, because there are individual differences in the refrigerator, the refrigerator is illustrated in the refrigerator catalog that the power consumption has about 3% margin. On the other hand, according to an embodiment, although individual differences in the heat insulating performance are excluded, individual differences caused by variations in the refrigeration cycle components such as differences in the ease of flow of the refrigerant, may be reduced. In other words, it is possible to maximize performance for all objects. Therefore, it is possible to write out the power consumption without a margin in the catalog of the refrigerator The embodiment has been described as being applied to a refrigerator, but is not limited thereto. For example, the embodiment is applicable to various products for cooling foods at a plurality of temperatures, such as a freezing container and a freezing truck. It is also applicable to other products having a refrigeration cycle, such as an air conditioner.

As is apparent from the above description, it is possible to drive a component constituting the refrigeration cycle in accordance with a state at a time before a state in which the refrigeration cycle cools a certain storage compartment is switched to a state the refrigeration cycle does not cool the certain storage compartment.

Although a few embodiments of the present disclosure have been shown and described, it would be appreciated by those skilled in the art that changes may be made in these embodiments without departing from the principles and spirit of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A refrigerator comprising:
a compressor configured to circulate a refrigerant;
a condenser configured to condense the refrigerant circulated by the compressor;
a cooling component configured to cool a storage compartment using the refrigerant condensed by the condenser, the cooling component comprising at least one of an expansion valve or a fan; and
a processor configured to:
drive the expansion valve or the fan,
obtain a load variation of the storage compartment of the refrigerator by using a specific value of a first state varying with time and comprising an internal temperature of the storage compartment, the load variation having an effect on a refrigeration cycle,
identify a drive value for driving the compressor based on the load variation,
drive the compressor based on the drive value for driving the compressor, and
obtain the load variation over a period of time during at least one cooling period in which the refrigeration cycle cools the storage compartment,
wherein the processor is further configured to:
identify a change in a first state value corresponding to a plurality of second state values based on the specific value of the first state,
identify at least two values of a second state at which a constraint condition is satisfied based on the change in the first state value and the plurality of the second state values,
identify a specific value of the second state based on the at least two values of the second state, and
determine the drive value for driving the compressor as the specific value of the second state.

2. The refrigerator of claim 1, wherein, during a predetermined period shorter than the cooling period, the processor is configured to obtain the load variation by using the specific value of Rail the first state.

3. The refrigerator of claim 1, wherein:
the first state comprises at least one of the internal temperature of the refrigerator or an external temperature of the refrigerator; and
the second state comprises a setting of at least one of the compressor or the cooling component.

4. The refrigerator of claim 3, wherein the setting comprises a setting of a degree of cooling of the cooling component.

5. The refrigerator of claim 3, wherein the setting of the compressor comprises a number of revolutions of the compressor.

6. The refrigerator of claim 4, wherein:
the cooling component comprises the expansion valve; and
the setting of the degree of cooling comprises an opening degree of the expansion valve.

7. The refrigerator of claim 4, wherein:
the cooling component comprises the fan; and
the setting of the degree of cooling comprises a number of revolutions of the fan.

8. The refrigerator of claim 1, wherein the processor is configured to:
identify the change in the first state value corresponding to the plurality of the second state values as an estimation model;
identify a state of the estimation model based on the specific value of the first state and the change in the first state value from a past value of the first state; and
estimate a change in the first state value based on the specific value of the first state based on the state of the estimation model.

9. The refrigerator of claim 1, wherein the processor is configured to:
estimate an indicator for each of at least two values of the second state based on the specific value of the first state; and
identify the specific value of the second state from the at least two values of the second state based on the indicator for each of the at least two values of the second state.

10. The refrigerator of claim 9, wherein:
the indicator comprises power consumption of the refrigerator; and
the specific value of the second state is a set value of the compressor making the power consumption minimized.

11. The refrigerator of claim 1, wherein, based on the refrigeration cycle being configured to alternately cool a first storage compartment and a second compartment, the processor is configured to use allowing one of a temperature of the first storage compartment and a temperature of the second compartment to be decreased to reach a predetermined temperature until the other of the temperature of the first storage compartment and the temperature of the second compartment is increased to reach a predetermined temperature as the constraint condition.

12. The refrigerator of claim 1, wherein, based on the refrigeration cycle being configured to simultaneously cool a first storage compartment and a second compartment, the processor is configured to use allowing one of a temperature of the first storage compartment and a temperature of the second compartment to be increased to reach a predetermined temperature until the other of the temperature of the first storage compartment and the temperature of the second compartment is increased to reach a predetermined temperature as the constraint condition.

13. The refrigerator of claim 1, wherein, during a period in which the constraint condition is satisfied at an end point thereof, the processor is configured to:
estimate whether or not the constraint condition is satisfied at an end point thereof based on the specific value of the first state a plurality of times; and
identify the specific value of the second state.

14. The refrigerator of claim 1, wherein, during a period in which the constraint condition is satisfied at an end point thereof, the processor is configured to:
estimate the change in the first state value for each of a plurality of second state values based on the specific value of the first state;
estimate whether or not the constraint condition is satisfied at an end point thereof a plurality of times;
identify the at least two values of the second state to allow the constraint condition to be satisfied at the end point based on the change in the first state value and the plurality of the second state values; and identify the specific value of the second state based on the at least two values of the second state.

15. The refrigerator of claim 1, wherein the processor is configured to:

form an estimation model configured to generate a stop condition or the drive value of the compressor based on a past load variation and based on training of time series data in which past drive values, which are identified based on the past load variation, are accumulated in a time series; and change the stop condition or the drive value according to the load variation based on the estimation model.

16. A control method of a refrigerator comprising:

acquiring a load variation of a storage compartment of the refrigerator by using a specific value of a first state varying with time and comprising an internal temperature of the storage compartment, the load variation having an effect on a refrigeration cycle;

determining a drive value that is to drive a compressor based on the load variation;

driving the compressor based on the drive value; and acquiring the load variation over a period of time during at least one cooling period in which the refrigeration cycle cools the storage compartment, wherein the acquiring of the load variation comprises:

identifying a change in a first state value corresponding to a plurality of second state values based on the specific value of the first state, identifying at least two values of a second state at which a constraint condition is satisfied based on the change in the first state value and the plurality of the second state values, and identifying a specific value of the second state based on the at least two values of the second state, and wherein the determining of the drive value comprises determining the drive value for driving the compressor as the specific value of the second state.

* * * * *